United States Patent
Adachi et al.

(10) Patent No.: US 8,031,305 B2
(45) Date of Patent: Oct. 4, 2011

(54) TRANSFLECTIVE LIQUID CRYSTAL DISPLAY COMPRISING A POLARIZING LAYER DISPOSED BETWEEN A REFLECTIVE LAYER AND AN ELECTRODE GROUP, AND THE REFLECTIVE LAYER IS AN UPPER LAYER OF A TFT IN THE REFLECTION AREA

(75) Inventors: Masaya Adachi, Hitachi (JP); Chieko Araki, Hitachi (JP); Jun Tanaka, Kawasaki (JP); Miharu Otani, Yokohama (JP); Osamu Itou, Hitachi (JP); Shinichiro Oka, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 64 days.

(21) Appl. No.: 11/954,021

(22) Filed: Dec. 11, 2007

(65) Prior Publication Data

US 2008/0143939 A1   Jun. 19, 2008

(30) Foreign Application Priority Data

Dec. 14, 2006   (JP) .................... 2006-336477

(51) Int. Cl.
   *G02F 1/1335*   (2006.01)
   *G02F 1/1343*   (2006.01)
(52) U.S. Cl. .................... 349/114; 349/96; 349/141
(58) Field of Classification Search .............. 349/96, 349/42, 43, 138, 139, 143, 147, 114
See application file for complete search history.

(56) References Cited

U.S. PATENT DOCUMENTS

| | | | |
|---|---|---|---|
| 2005/0105023 A1* | 5/2005 | Kim et al. | 349/114 |
| 2005/0157230 A1* | 7/2005 | Yang et al. | 349/114 |
| 2006/0181661 A1* | 8/2006 | Kudou et al. | 349/114 |
| 2006/0256264 A1* | 11/2006 | Yang et al. | 349/114 |
| 2006/0268206 A1* | 11/2006 | Nishimura | 349/114 |
| 2006/0279677 A1* | 12/2006 | Matsushima | 349/114 |
| 2007/0002226 A1* | 1/2007 | Sakamoto et al. | 349/114 |

FOREIGN PATENT DOCUMENTS

| | | |
|---|---|---|
| JP | 2005-250430 | 9/2005 |
| JP | 2006-171723 | 6/2006 |
| JP | 2006-184325 | 7/2006 |

OTHER PUBLICATIONS

Oyama et al., Liquid Crystal Display Device and its Manufacturing Method, Sep. 15, 2005, Machine Translation of JP Pub 2005-250430, pp. 1-69.*
"Current Status and Future Prospect of In-Cell Polarizer Technology" written by Y. Ukai et al. in SID 04 Digest, 2004.
"Ultra-Thin O-Polarizers' Superiority over E-Polarizers for LCDs" written by Ir Gvon Khan et al. in SID 04 Digest, 2004.

* cited by examiner

*Primary Examiner* — Mark A Robinson
*Assistant Examiner* — Dennis Y. Kim
(74) *Attorney, Agent, or Firm* — Antonelli, Terry, Stout & Kraus, LLP.

(57) ABSTRACT

A transflective liquid crystal display includes a first substrate, a second substrate, and liquid crystal intercalated between the first and second substrates in which each pixel includes a reflection area and a transmission area. The second substrate includes pixel electrodes and common electrodes to drive the liquid crystal. In the reflection area, a reflective layer is arranged between the pixel and common electrodes and the second substrate, and a polarizing layer is disposed between the pixel and common electrodes and the reflective layer.

10 Claims, 14 Drawing Sheets

US 8,031,305 B2

TRANSFLECTIVE LIQUID CRYSTAL DISPLAY COMPRISING A POLARIZING LAYER DISPOSED BETWEEN A REFLECTIVE LAYER AND AN ELECTRODE GROUP, AND THE REFLECTIVE LAYER IS AN UPPER LAYER OF A TFT IN THE REFLECTION AREA

CROSS-REFERENCE TO RELATED APPLICATION PENDING

This application is related to co-pending application Ser. No. 12/019,715, and claims priority from Japanese patent application JP 2006-336477 filed on Dec. 14, 2006, the contents of which are incorporated herein by reference in their entirety.

BACKGROUND OF THE INVENTION

The present invention relates to a liquid crystal display, and in particular, to a transflective liquid crystal display.

Display devices are media to visually transfer information to humans and are important for humans and their society in the highly developed information environment today. Liquid crystal displays have been tremendously developed in performance and hence are adopted as displays for various apparatuses such as cellular phones, personal computers, and large-screen television sets. In general, a liquid crystal display includes a liquid crystal display panel and a backlight (illuminating device) arranged on the rear surface of the display panel to emit light onto the panel. To display a color image, each pixel includes three subpixels respectively corresponding to, for example, three primary colors, i.e., red, blue, and green. The subpixel of each color can be independently controlled to reproduce various colors.

For mobile devices such as cellulars, a transflective liquid crystal displays is employed because of its performance to cope with wide-range illumination environments. In a display area of a liquid crystal panel of such transflective liquid crystal display, each subpixel includes a transmission area and a reflection area. The transmission area achieves transmissive display by controlling the amount of transmitted light from the backlight. On the other hand, the reflection area implements reflective display by controlling the amount of reflected light from the external area. That is, the transflective liquid crystal display primarily conducts transmissive display in a dark environment and reflective display in a bright environment to guarantee visibility of the display image, and hence is usable in a wide-range illumination environment.

In this connection, a liquid crystal display of In Plane Switching (IPS) type is known as a liquid crystal display having a wide viewing angle. The liquid crystal display of IPS type includes, like liquid crystal devices of other types such as a Vertical Alignment (AV) type and a Twisted Nematic type, a pair of transparent substrates, a liquid crystal layer intercalated therebetween, a pair of polarizers disposed respectively on surfaces of the associated transparent substrates, the surfaces of the substrates respectively opposing to the surfaces facing the liquid crystal layer. In the display, the state of polarization of light incident to the liquid crystal layer is changed to control the amount of transmitted light to thereby display an image. In the display of IPS type, pixel electrodes to drive the liquid crystal and common electrodes are formed on one and the same substrate. By providing a voltage potential difference between these electrodes, movement of liquid crystal molecules is controlled. The amount of transmitted light is controlled mainly by the movement of liquid crystal molecules in which the molecules rotate in a plane parallel to the associated plane of the substrates. This leads to a wide viewing angle for the following reasons. That is, when the screen of the display is viewed from an inclined direction, there do not occur disadvantages in which the contrast ratio of the displayed image abruptly lowers and inversion takes place in gradation. Transmissive liquid crystal displays of IPS type have already been put to practices in various fields. It has been highly expected that transflective liquid crystal displays are introduced to practical uses.

JP-A-2006-184325 describes a transflective liquid crystal display of IPS type including a polarizing layer which coats pixel electrodes and common electrodes. Specifically, in addition to the paired polarizers of the liquid crystal device, a new polarizing layer is arranged to coat the pixel electrodes and the common electrodes. The paired polarizers are disposed such that the absorption axes respectively thereof are perpendicular to each other, and the absorption axis of the polarizing layer is aligned with that of the polarizer disposed on the backlight side. In the configuration, in the transmissive display mode, when the driving voltage is zero, black (dark) display results and when the driving voltage is applied, bright display results basically as in the conventional liquid crystal display of IPS type. The display is hence a display of normally black type.

For the reflective display, the pixel electrodes and the common electrodes are formed using a reflective electrode material. Or, a reflecting layer is disposed as a layer other than the layers of these electrodes to provide a reflection area. Therefore, like in the transmissive display, the black (dark) display is implemented when the driving voltage is zero and the bright display is implemented when the driving voltage is effectively applied. It is hence possible to realize a transflective liquid crystal display of normally black type.

In the technique of JP-A-2006-184325, a Thin Crystal Film (TCF) of OPTIVA, Inc. is employed as the material of the polarizing layer. That is, a material of coating type is used for the polarizing layer. In this connection, materials of coating type to be used for the polarizing layer are described in pages 1170 to 1173 of "Current Status and Future Prospect of In-Cell Polarizer Technology" written by Y. Ukai et al. in SID 04 DIGEST, 2004 and in pages 1316 to 1319 of "Ultra-Thin O-Polarizers' Superiority over E-Polarizers for LCDS" written by Ir Gvon Khan et al. in SID 04 DIGEST, 2004.

SUMMARY OF THE INVENTION

In the configuration in which the polarizing layer is disposed to coat the pixel and common electrodes, when one and the same potential difference is applied to the pixel and common electrodes, the strength of the electric field effectively affecting the liquid crystal layer is reduced by the polarizing layer.

In the configuration, as compared with a configuration not including the polarizing layer coating the pixel and common electrodes, the display is darker and the contrast ratio lowers when one and the same driving voltage is utilized. The driving voltage which leads respectively to the maximum transmittance and the maximum reflectance becomes higher. This hence leads to a problem of increase in the power consumption. There also appears a problem in which the cost becomes greater due to use of an expensive driver capable of appling such higher voltages.

In addition, the transmittance of the polarizing layer is not 100% even for linearly polarized light having a vibration plane in a direction perpendicular to the absorption axis. Therefore, irrespectively of the driving of the liquid crystal, the transmittance in the transmission area lowers to make the display darker when compared with a configuration not including the polarizing layer.

In a situation wherein the polarizing layer is formed using a material of coating type in which the material is stretched in a coating direction by applying pressure thereto, the aligned state is disturbed by steps due to the pixel and common electrodes. It is hence feared that the polarizing layer is deteriorated in its optical property.

It is therefore an object of the present invention, which has been devised to solve the problems above, to provide a transflective liquid crystal display with a wide viewing angle which is capable of obtaining a high contrast ratio in the transmissive display and the reflective display without causing increase in the driving voltage.

In the present specification, the pixel electrodes and the common electrodes are formed on mutually different layers in which the electrodes on at least the side less apart from the liquid crystal layer are constructed in the form of a comb. Additionally, since the liquid crystal molecules rotate in the plane also in a configuration in which the liquid crystal is driven by forming a fringe electric field, the display device will be referred to as a display device of IPS (In-Plane Switching) type.

Other objects and novel aspects of the present invention will be clarified through the description and by referring to accompanying drawings of the present specification.

To achieve the objects according to the present invention, there is provided a transflective liquid crystal display including a liquid crystal display panel including a first substrate, a second substrate, a liquid crystal layer intercalated between the first substrate and the second substrate, and pixel electrodes and common electrodes disposed on the second substrate for driving the liquid crystal layer; a backlight disposed on one surface of the liquid crystal display panel; a first polarizer disposed on a first side of the first substrate, the first side being opposite to a side of the first substrate where the second substrate is disposed; and a second polarizer disposed on a first side of the second substrate, the first side being opposite to a side of the second substrate where the first substrate is disposed. The liquid crystal display panel including pixels, each pixel including a reflection area and a transmission area; the reflection area includes a reflective layer disposed between the pixel electrodes and the common electrodes and the second substrate and a polarizing layer disposed between the pixel electrodes and the common electrodes and the reflective electrode; the first polarizer includes an absorption axis and the second polarizer includes an absorption axis, the axes being perpendicular to each other, and the polarizing layer includes an absorption axis parallel to the absorption axis of the second polarizer; and the liquid crystal layer includes an alignment direction parallel or perpendicular to the absorption axis of the first polarizer.

According to the present invention, there is provided a transflective liquid crystal display including a liquid crystal display panel including a first substrate, a second substrate, a liquid crystal layer intercalated between the first substrate and the second substrate, and pixel electrodes and common electrodes disposed on the second substrate for driving the liquid crystal layer; a backlight disposed on one surface of the liquid crystal display panel; a first polarizer disposed on a first side of the first substrate, the first side being opposite to a side of the first substrate where the second substrate is disposed; and a second polarizer disposed on a first side of the second substrate, the first side being opposite to a side of the second substrate where the first substrate is disposed. The liquid crystal display panel includes pixels, each pixel including a reflection area and a transmission area; the reflection area includes a reflective layer disposed between the pixel electrodes and the common electrodes and the second substrate and a polarizing layer disposed between the reflective electrode and the liquid crystal layer; the first polarizer includes an absorption axis and the second polarizer includes an absorption axis, the axes being perpendicular to each other, and the polarizing layer includes an absorption axis parallel to the absorption axis of the second polarizer; the liquid crystal layer includes an alignment direction of liquid crystal molecules, the alignment direction being parallel or perpendicular to the absorption axis of the first polarizer; the common electrodes and the pixel electrodes are formed on mutually different layers, the layers intercalating an insulation layer; the pixel electrodes or the common electrodes less apart from the liquid crystal layer are formed in a contour of a comb, and the pixel electrodes or the common electrodes more apart from the liquid crystal layer are formed in a planar contour; the pixel electrodes and the common electrodes are formed using a transparent electrical conductive material; and the absorption axis of the polarizing layer is parallel or perpendicular to one edge of the second substrate.

The modules other than those described above will be clarified in the description below.

It is possible according to the present invention to implement a transflective liquid crystal display in which the transmissive display and the reflective display are achieved with high brightness and a high contrast ratio.

Other objects, features and advantages of the invention will become apparent from the following description of the embodiments of the invention taken in conjunction with accompanying drawings.

DETAILED DESCRIPTION OF THE INVENTION

Figure 1:
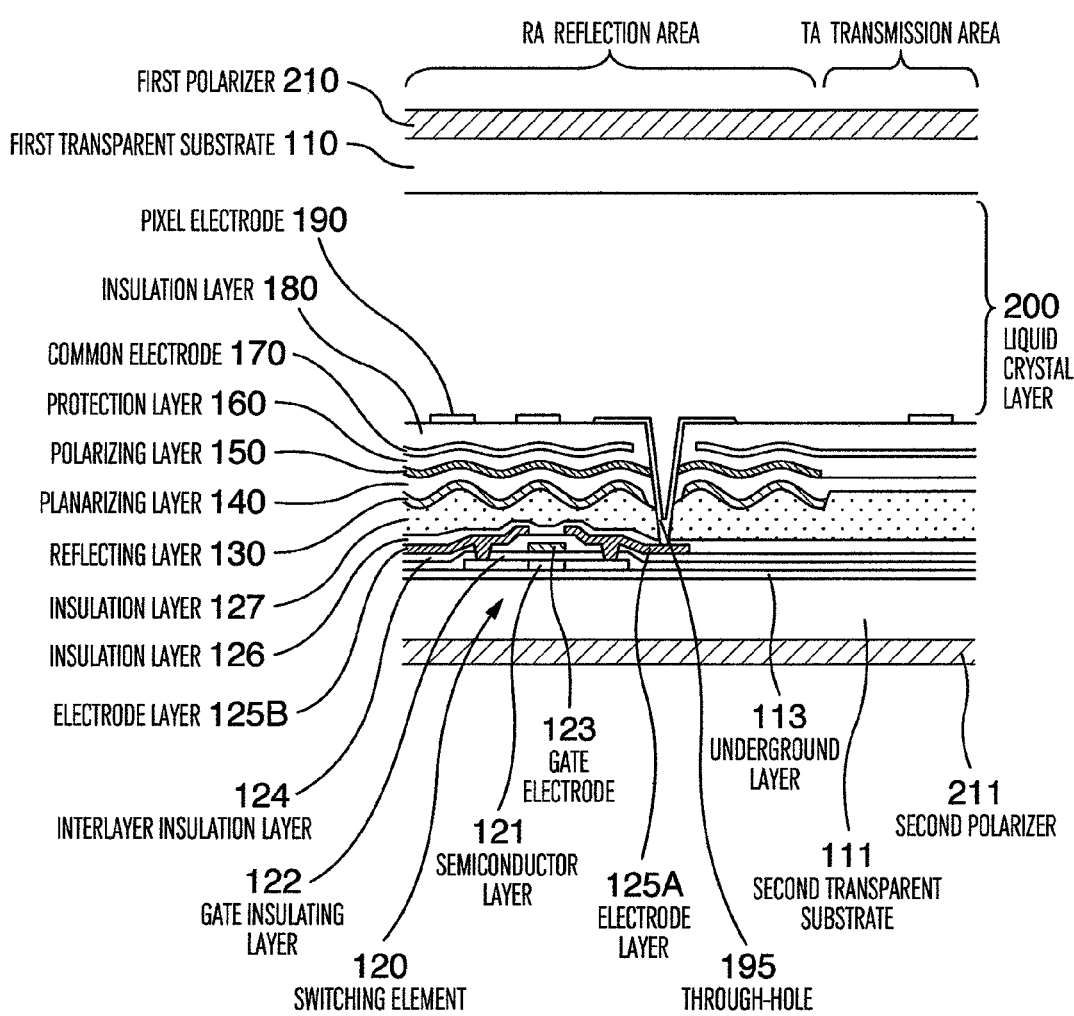
FIG. 1 is a cross-sectional view showing a general configuration of a primary section of a subpixel used in a liquid crystal display panel of a transflective liquid crystal display according to the present invention.

According to one aspect of the present invention, there is provided a transflective liquid crystal display including a liquid crystal display panel including a first substrate, a second substrate, a liquid crystal layer intercalated between the first substrate and the second substrate, and pixel electrodes and common electrodes disposed on the second substrate for driving the liquid crystal layer; a backlight disposed on one surface of the liquid crystal display panel; a first polarizer disposed on a first side of the first substrate, the first side being opposite to a side of the first substrate where the second substrate is disposed; and a second polarizer disposed on a first side of the second substrate, the first side being opposite to a side of the second substrate where the first substrate is disposed. The liquid crystal display panel including pixels, each pixel including a reflection area and a transmission area; the reflection area includes a reflective layer disposed between the pixel electrodes and the common electrodes and the second substrate and a polarizing layer disposed between the pixel electrodes and the common electrodes and the reflective electrode; the first polarizer includes an absorption axis and the second polarizer includes an absorption axis, the axes being perpendicular to each other, and the polarizing layer includes an absorption axis parallel to the absorption axis of the second polarizer; and the liquid crystal layer includes an alignment direction parallel or perpendicular to the absorption axis of the first polarizer.

According to one aspect of the present invention, there is provided a transflective liquid crystal display including a liquid crystal display panel including a first substrate, a second substrate, a liquid crystal layer intercalated between the first substrate and the second substrate, and pixel electrodes and common electrodes disposed on the second substrate for driving the liquid crystal layer; a backlight disposed on one surface of the liquid crystal display panel; a first polarizer disposed on a first side of the first substrate, the first side being opposite to a side of the first substrate where the second substrate is disposed; and a second polarizer disposed on a first side of the second substrate, the first side being opposite to a side of the second substrate where the first substrate is disposed. The liquid crystal display panel includes pixels, each pixel including a reflection area and a transmission area; the reflection area includes a reflective layer disposed between the pixel electrodes and the common electrodes and the second substrate and a polarizing layer disposed between the reflective electrode and the liquid crystal layer; the first polarizer includes an absorption axis and the second polarizer includes an absorption axis, the axes being perpendicular to each other, and the polarizing layer includes an absorption axis parallel to the absorption axis of the second polarizer; the liquid crystal layer includes an alignment direction of liquid crystal molecules, the alignment direction being parallel or perpendicular to the absorption axis of the first polarizer; the common electrodes and the pixel electrodes are formed on mutually different layers, the layers intercalating an insulation layer; the pixel electrodes or the common electrodes less apart from the liquid crystal layer are formed in a contour of a comb, and the pixel electrodes or the common electrodes more apart from the liquid crystal layer are formed in a planar contour; the pixel electrodes and the common electrodes are formed using a transparent electrical conductive material; and the absorption axis of the polarizing layer is parallel or perpendicular to one edge of the second substrate.

Description will now be given of embodiments of the present invention by referring to the drawings. However, the embodiments may be changed and modified in various ways, and combinations of the embodiments are also included in the scope and spirit of the present invention.

Embodiment 1

Figure 2:
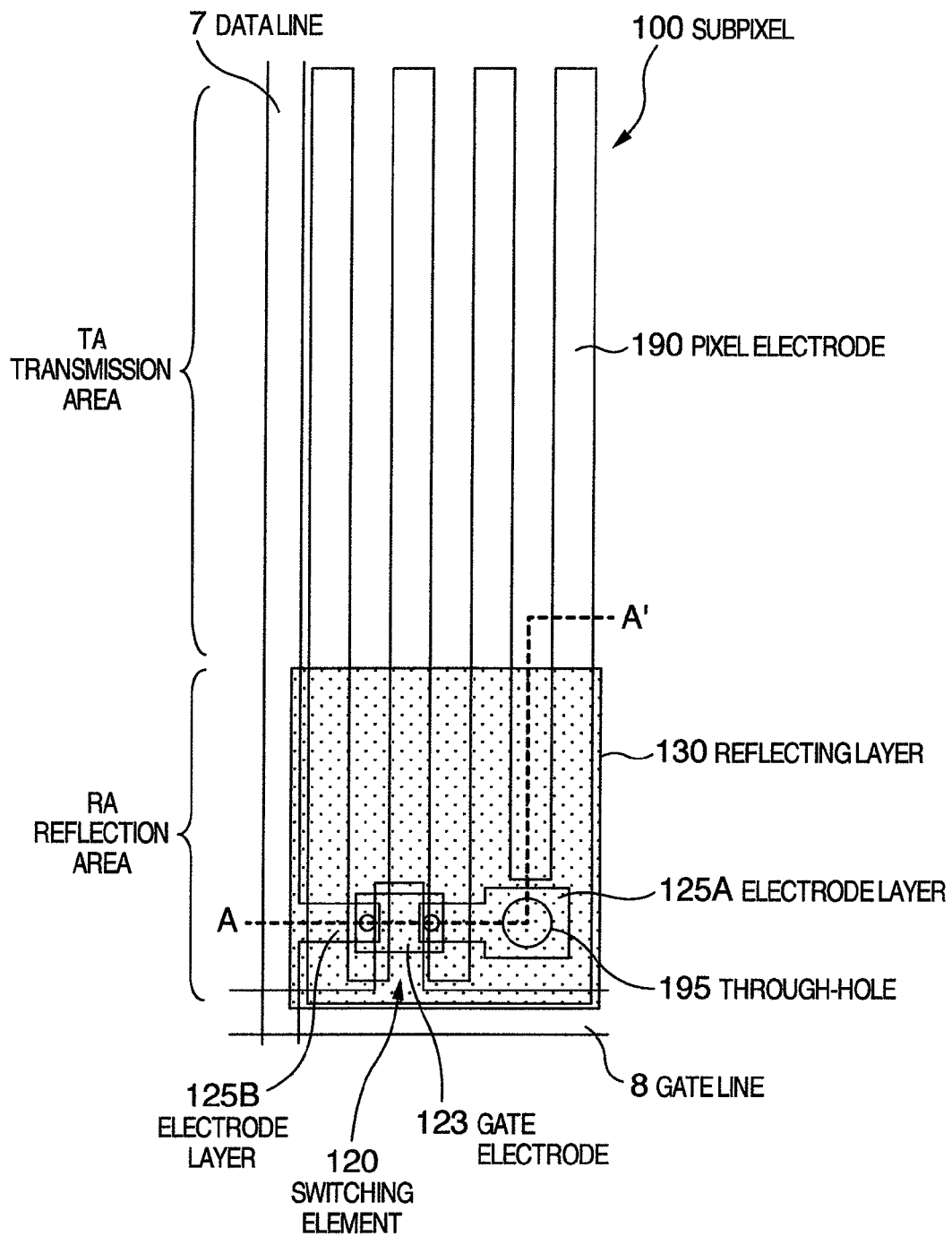
FIG. 2 is a plan view showing a general configuration of the primary section of a subpixel used in a liquid crystal display panel of a transflective liquid crystal display of the present invention.

FIG. 1 shows a general configuration in a cross-sectional view of a primary section of a subpixel 100 used in a liquid crystal display panel 1 of a transflective liquid crystal display according to the present invention. FIG. 2 shows a general configuration in a plan view of a primary section of the subpixel 100 used in a liquid crystal display panel 1 of a transflective liquid crystal display. FIG. 1 schematically shows a cross-sectional configuration of the subpixel 100 taken along line A-A' of FIG. 2.

Figure 3:
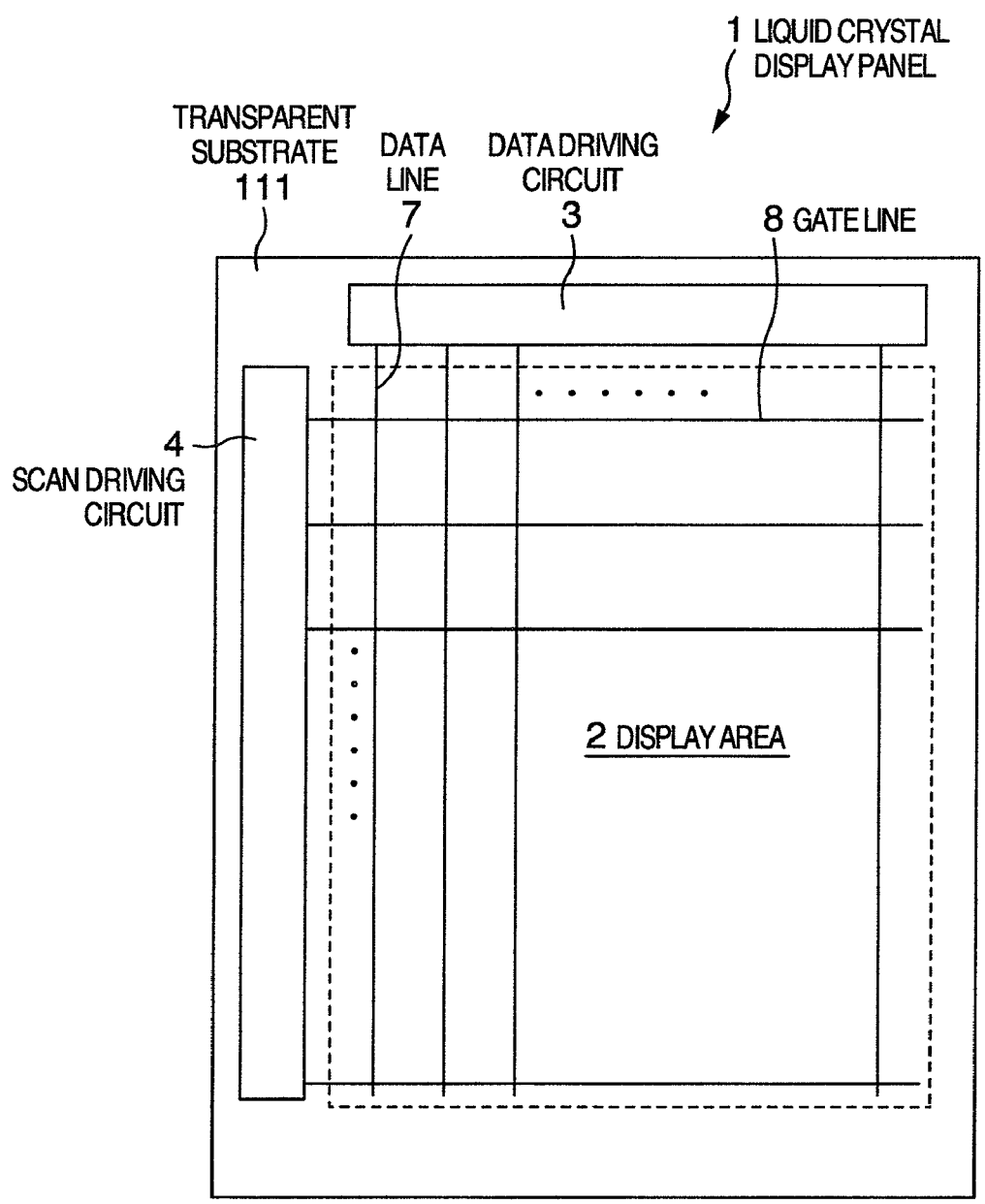
FIG. 3 is a block diagram showing an overall layout of a liquid crystal display panel of a transflective liquid crystal display of the present invention.

FIG. 3 is a block diagram schematically showing an example of an overall layout of a liquid crystal display panel 1 in a transflective liquid crystal display of the present invention. As FIG. 3 shows, the panel 1 includes a second transparent substrate 111 and a display area 2 disposed in an area including a central section of the second transparent substrate 111. On an upper side of the display area 2, there is arranged a data driver circuit 3 to output an image signal to a data line (signal line) 7. On a left side thereof, there is disposed a scan driver circuit 4 to output a scan signal to a gate line (scan line) 8. The scan driver circuits 3 and the scan driver circuits 4 include a shift register circuit, a level shifter circuit, and an analog switch circuit which include a complementary circuit including n-channel and p-channel Thin Film Transistors (TFT). In the liquid crystal panel 1 as the conventional liquid crystal panel of active matrix driving type, there are disposed a plurality of gate lines and a plurality of data lines extending or stretching in a direction to intersect the gate lines. At intersections or crosspoints between the gate and data lines, subpixels are arranged in the form of a matrix. As can be seen from FIGS. 1 and 2, the subpixel of the liquid crystal panel according to the present invention includes a transmission area TA and a reflection area RA.

As FIG. 1 shows, the liquid crystal panel according to the present invention includes a first transparent substrate 110 and a second transparent substrate 110 which are flat and transparent and which are made of an isolating and optically isotropic transparent substance. Glass is generally employed as the first and second substrates 110 and 111. However, it is also possible to adopt a polymer film which meets the requirements and which has improved strength against heat and higher durability.

On the transparent substrate 110, a color filter and an alignment layer, which are not shown, are laminated. Each color filter disposed for a subpixel is associated with a particular color which passes through the subpixel. The particular color is one of, for example, three primary colors of additive color mixing, i.e., red, green, and blue; three primary colors of subtractive color mixing, i.e., yellow, magenta, and cyan; or blue-green and yellow-green.

In the reflection area, light from the outside passes the color filter twice. Therefore, it is also possible that the thickness of color of the filter, the thickness of the filter, or the coating area thereof varies between the reflection area and the transmission area.

The alignment layer may be made of, for example, polyimide series or diamond like carbon.

A switching element 120 is disposed in the second transparent substrate 111. The element 120 includes a thin film transistor including a semiconductor layer made of polysilicon, amorphous silicon, or organic matter. Although the transistor includes polysilicon as an example in this embodiment, the present invention is not restricted by the embodiment. The switching element 120 including a polysilicon thin film transistor is configured as below. On a polysilicon layer including a semiconductor layer 121 to be used as a source-drain region and a channel region, there are formed a gate insulating layer 122, a gate electrode 123, a first interlayer insulation layer 124, an electrode layer 125A, an electrode layer 125B, and a second interlayer insulation layer 126.

The gate insulating layer 122 and the first interlayer insulation layer 124 are formed using, for example, silicon oxide (SiOx) and the second interlayer insulation layer 126 is made of, for example, silicon nitride (SiNx).

The electrode layers 125A and 125B are formed using a metallic electrode material. There may be used, for example, a three-layered film including an aluminum layer intercalated between titanium (Ti) and tungsten or wolfram (W). However, the present invention is not restricted by the embodiment. The electrode layers 125A and 125B are connected via an opening formed in the interlayer insulation layer 124 respectively to a source region and a drain region of the semiconductor layer 121.

Between the switching element 120 and the second transparent substrate 111, a foundation layer 113 is favorably disposed to block mixing of ions such as sodium (Na) and potassium (K) from the second transparent substrate 111 into the semiconductor layer 121 and the gate insulating layer 122. Assume that the foundation layer 113 is a laminated layer including a layer of silicon nitride and a layer of silicon oxide in this order on the side of the second transparent substrate 111.

On the switching element 120, an insulation layer 127 is formed. The layer 127 has a function to planarize steps due to the switching element 120 or the like and a function to form a contour of depressions and projections on a reflecting layer, which will be described later.

To planarize the steps, there is favorably employed a material which is in a solution state and which is capable of forming a layer. Therefore, the insulation layer 127 may be made of an organic material or an inorganic material available as a coating material when dispersed in a solvent. The insulation layer 127 requires a process to form its surface having depressions and projections. That is, if the material employed for the layer 127 is photosensitive, the process can be advantageously simplified. In the transmission area, to efficiently transmit light from the backlight, the insulation layer 127 is favorably made of a transparent material less absorbing visible light. Therefore, the insulation layer 127 is desirably made of an organic material, for example, photosensitive polyimide or acrylic resin.

To form depressions and projections on a surface of the reflecting layer in the reflection area, the insulation layer 127 has a surface including depressions and projections in the reflection area. The contour of depressions and projections may be formed as follows. A pattern of depressions and projections are first formed using a photolithographic method and then the pattern is molten at a particular high temperature. Or, a half-tone mask may be used in the exposure equipment to obtain the contour. On the other hand, the surface of the insulation layer 127 is flat in the transmission area.

On the insulation layer 127, a reflecting layer 130 is formed in a region of the layer 127 corresponding to the reflection area. The reflecting layer 130 is favorably made of metallic materials having a high reflection factor such as aluminum and silver. The layer 130 is removed from the transmission area using, for example, photolithographic method. The reflecting layer 130 has a surface including depressions and projections formed due to the contour of depressions and projections of the surface of the insulation layer 127. Due to the depressions and projections of the reflecting layer 130, light radiated from the outside onto the layer 130 reflects in a wide range of angle. This makes the reflective display brighter in actual uses.

On the reflecting layer 130, a planarizing layer 140 is arranged according to necessity. The planarizing layer 140 prevents deterioration, caused by the contour of depressions and projections of the reflecting layer 130, in the optical property of a polarizing layer 150 formed as an upper layer of the reflecting layer 130. That is, the planarizing layer 140 is employed to provide a planar surface on which the polarizing layer 150 is formed. By disposing the planarizing layer 140, it is possible to suppress deterioration in the optical property of the polarizing layer 150, contributing to brighter image display with a higher contrast ratio.

The planarizing layer 140 is made of an insulating material, favorably, a transparent material which is capable of forming a layer when used in a solution state and which less absorbs visible light. Like the insulation layer 127, the planarizing layer 140 is favorably made of an organic material, for example, polyimide resin or acrylic resin.

The polarizing layer 150 is formed on the reflecting layer 130. In the configuration, it is favorable as described above to arrange the planarizing layer 140 between the reflecting layer 130 and the polarizing layer 150 according to necessity. The polarizing layer 150 absorbs linearly polarized light having a plane of vibration in a first axis direction and transmits linearly polarized light having a plane of vibration in a second axis direction perpendicular to the first axis direction. It is possible to form the polarizing layer 150 by coating, for example, a lyotropic liquid crystal dye described in pages 1170 to 1173 of "Current Status and Future Prospect of In-Cell Polarizer Technology" written by Y. Ukai et al. in SID 04 DIGEST, 2004 or in pages 1316 to 1319 of "Ultra-Thin O-Polarizers' Superiority over E-Polarizers for LCDS" written by Ir Gvon Khan et al. in SID 04 DIGEST, 2004. For example, if the material described in the former is used, a slit dye coater is favorably employed to coat the material for the polarizing layer 150. While supplying the material in the solution state onto the coating surface, the slit dye coater is capable of stretching the material in the coating direction by applying pressure to the material. As a result of the coating process, the dye is aligned and is fixed to thereby produce a polarizing layer. In this situation, the absorption axis of the polarizing layer is perpendicular to the coating direction. To form the polarizing layer, it is also possible to use a material which obtains the polarizing function when linearly polarized light is radiated onto the material.

It is not desirable that the polarizing layer 150 is formed in the transmission area, which will be described later. Therefore, in the description of the present embodiment, the polarizing layer 150 is not formed in the transmission area.

In the reflection area RA and the transmission area TA, a common electrode 170 is configured in an upper layer of the polarizing layer 150. That is, in the transmission area TA, the common electrode 170 is formed regardless of presence or absence of the polarizing layer 150. According to necessity, a protection layer 160 may be arranged between the polarizing layer 150 and the common electrode 170.

The protection layer 160 is favorably disposed to suppress deterioration of the polarizing layer 150 in a process after the creation thereof or to prevent impurity from the polarizing layer 150 from contaminating other constituent elements. The protection layer 160 is favorably made of a material which is transparent with respect to visible light, specifically, a transparent resin material, e.g., polyimide series or acrylic resin or a transparent inorganic material, e.g., silicon oxide (SiOx) or silicon nitride (SiOx). For high performance of the protection layer, it is favorable to employ silicon nitride capable of forming a fine layer.

The removing of the polarizing layer 150 from the transmission area TA using, for example, the photolithographic method may be carried out. Even after removing the polarizing layer 150 from the transmission area TA using a transparent, photosensitive material as the resist material, the resist material is kept remained in the reflection area and is used as the protection layer 160. This leads to an advantage to reduce the number of processes.

The common electrode 170 is made of a transparent, electrically conductive material. For example, Indium Tin Oxide (ITO) is favorably employed. It is also possible to use other transparent, electrically conductive materials such as InZnO and ZnO.

On the common electrode 170, there is formed an insulation layer 180 on which a pixel electrode 190 is arranged. The protection layer 180 is favorably made of materials transparent with respect to visible light, specifically, transparent resin materials such as polyimide series and acrylic resin or transparent inorganic materials such as silicon oxide (SiOx) and silicon nitride (SiNx).

The pixel electrode 190 is desirably made of a transparent, electrically conductive material as in the case of the common electrode 170. For example, ITO is favorably employed, and it is also possible to use other transparent electrically conductive materials such as InZnO and ZnO. The pixel electrode 190 is connected to the electrode layer 125A of the switching element 120 via a through-hole 195 which passes through the insulation layer 180, the common electrode 170, the protection layer 160, the polarizing layer 150, the planarizing layer 140, the reflecting layer 130, and the insulation layers 127 and 126. The through-hole 195 is directly filled with an electrically conductive material used also for the pixel electrode 190. Or, to secure the electric connection between the electrode materials of the electrode layer 125A and the pixel electrode 190, there may be arranged an intermediate layer made of a conductive material, not shown.

To secure separation between the common electrode 170 and the pixel electrode 190 in the through-hole 195, an opening is disposed in the common electrode 170 in an area corresponding to the though-hole 195 so that common electrode 170 is completely separated from the pixel electrode 190.

If the reflection layer 130 is made of an electrically conductive material, to also secure separation between the reflection layer 130 and the pixel electrode 190 in the through-hole 195, an opening is disposed in the reflection layer 130 in an area corresponding to the though-hole 195 so that the reflection layer 130 is completely separated from the pixel electrode 190.

As FIG. 2 shows, the pixel electrode 190 is configured in the form of a comb. As shown in FIG. 2, an electrode layer 125B connects to the data line 7 and the gate electrode 123 connects to the gate line 8. It is also possible that part of the data line 7 is used as the electrode layer 125B and part of the gate line 8 is used as the gate electrode 123.

On the insulation layer 180 and the pixel electrode 190, an alignment layer, not shown, is formed to coat the insulation layer 180 and the electrode 190. The alignment layer is made of, for example, polyimide series or diamond like carbon as in the case of an alignment layer formed on the first transparent substrate.

The first transparent substrate 110 and the second transparent substrate 111 are disposed to be separated by a spacer, not shown, from each other with the respective alignment films opposing each other. Peripheral portions respectively of the substrates 110 and 111 are fixed by a seal material onto each other to resultantly form an inner space therein. The space is filled with nematic liquid crystal having positive dielectric anisotropy and is then sealed up to thereby construct a liquid crystal layer 200. By conducting alignment treatment for the alignment layers respectively on the substrates 110 and 111, the alignment direction of the long axis of liquid crystal molecules is determine. It is assumed that the liquid crystal alignment direction of the liquid crystal layer 200 is a homogeneous direction, i.e., not distorted between the transparent substrates 110 and 111.

It is desirable to select thickness d of the liquid crystal layer 200 and the anisotropy of the refractive index $\Delta n$ such that retardation $\Delta nd$ is one half of the wavelength. That is, the retardation $\Delta nd$ is 275 nanometers (nm) for light having a wavelength of 550 nm. However, the alignment of liquid crystal molecules does not homogeneously change in an actual liquid crystal display panel. Therefore, to make the display brighter, the retardation $\Delta nd$ for the liquid crystal layer 200 is favorably selected to be slightly larger than one half of the wavelength. For example, for the light having a wavelength of 550 nm, it is favorable to select the value of $\Delta nd$ in a range from 275 nm to 400 nm. Incidentally, to reduce the difference in the relationship between the liquid crystal driving voltage and the display brightness for the transmission area and the reflection area, it is favorable that the thickness of the liquid crystal layer is kept same in the transmission area and the reflection area.

A first polarizer 210 and a second polarizer 211 are arranged on the surfaces respectively of the first and second transparent substrates 110 and 111, the surfaces being opposite to the respective surfaces on the side of the liquid crystal layer 200 of the substrates 110 and 111. The polarizers 210 and 211 may be formed, for example, as below. By adsorbing iodine into stretched polyvinylalcohol, there is prepared a film having a polarizing function. On both surfaces of the film, a protection layer is formed using triacetylcellulose to thereby produce a target film for the polarizers. It is desirable that the first and second polarizers 210 and 211 are fixed by transparent adhesive onto the first and second transparent substrates 110 and 111, respectively.

Figure 4:
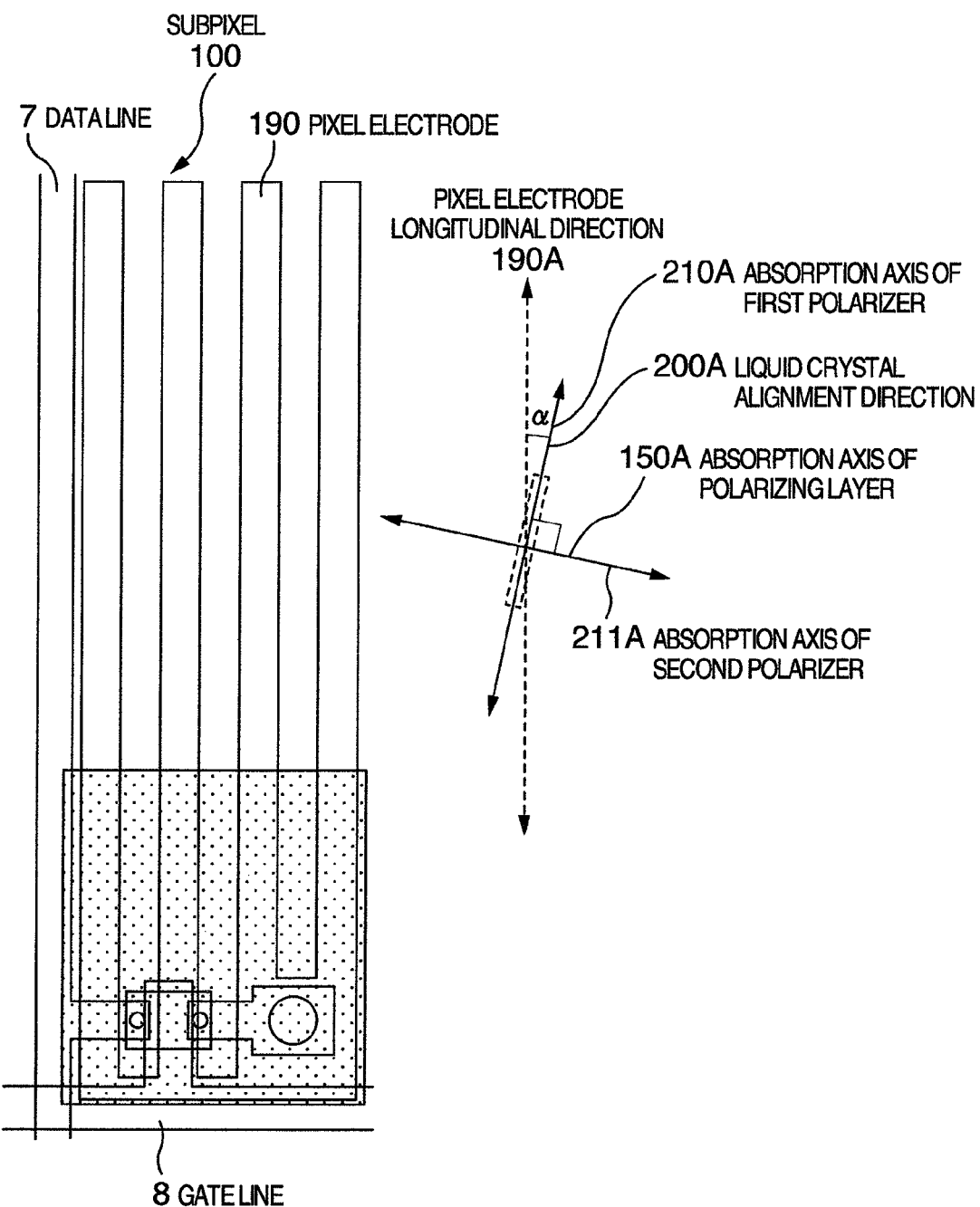
FIG. 4 is a schematic diagram for explaining a relationship of an optical axis of a member used in the liquid crystal display panel of a transflective liquid crystal display of the present invention.

FIG. 4 is a schematic diagram for explaining a relationship between an absorption axis 210A of linearly polarized light of the first polarizer 210, an absorption axis 211A of linearly polarized light of the second polarizer 211, an alignment direction (liquid crystal orientation direction) 200A of a molecular long axis of liquid crystal in the liquid crystal layer 200, an absorption axis 150A of linearly polarized light of the polarizing layer 150, and a longitudinal direction 190A of the pixel electrode 190.

Also according to the present invention, as in the conventional liquid crystal display of IPS type, the alignment direction (liquid crystal orientation direction) 200A of a molecular long axis of liquid crystal in the liquid crystal layer 200 is inclined by an angle of α relative to the longitudinal direction 190A of the pixel electrode 190. This angle is set within a range from ±5° to ±30°. In consideration of alignment stability and display brightness, the angle is desirably set within a range from ±7° to ±15°. The absorption axis 210A of linearly polarized light of the first polarizer 210 is perpendicular to the absorption axis 211A of linearly polarized light of the second polarizer 211. The absorption axis 210A is parallel or perpendicular to the alignment direction (liquid crystal orientation direction) 200A of a molecular long axis of liquid crystal in the liquid crystal layer 200. The absorption axis 150A of the polarizing layer 150 is parallel to the absorption axis 211A of the second polarizer 211 in the transflective liquid crystal display of the present invention.

As FIG. 4 shows, the longitudinal direction 190A of the pixel electrode 190 is parallel to the stretching direction (extending direction) of the data line 7 and the absorption axis 210A of the first polarizer 210 and the liquid crystal alignment direction 200A are inclined by angle α, e.g., 10° relative to the longitudinal direction 190A of the pixel electrode 190. The absorption axis 211A of the second polarizer 211 and the absorption axis 150A of the polarizing layer 150 are perpendicular to the absorption axis 210A of the first polarizer 210 and the liquid crystal alignment direction 200A.

Therefore, if the polarizing layer 150 is made of the material described in pages 1170 to 1173 of "Current Status and Future Prospect of In-Cell Polarizer Technology" written by Y. Ukai et al. in SID 04 DIGEST, 2004, the coating direction of the material is the extending direction of the data line 7, that is, the direction inclined by angle α relative to the longitudinal direction of the pixel electrode 190.

It is also possible that the absorption axis 210A of the first polarizer 210, the absorption axis 211A of the second polarizer 211, and the absorption axis 150A of the polarizing layer 150 are rotated 90° relative to the direction exemplified in FIG. 4.

Figure 5:
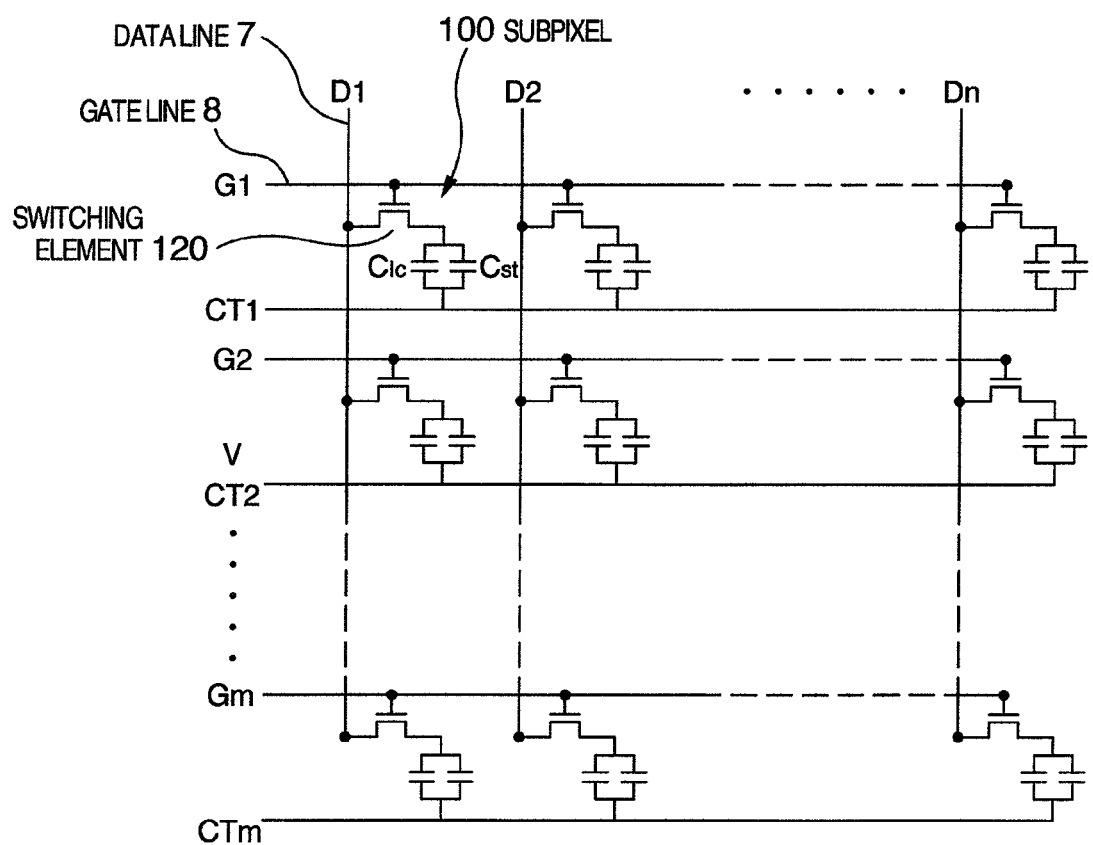
FIG. 5 is a diagram showing an equivalent circuit of an active matrix configured in a display area 2 of a liquid crystal display panel 1 of a transflective liquid crystal display of the present invention.

FIG. 5 shows an equivalent circuit of an active matrix configured in a display area 2 of a liquid crystal display panel 1 of a transflective liquid crystal display of the present invention. Like the conventional liquid crystal display of active matrix drive type, the liquid crystal display panel 1 includes a plurality of gate lines and a plurality of data lines extending in a direction intersecting a direction in which the gate lines extend. As FIG. 5 shows, subpixels 100 are arranged at intersections or crosspoints between m gate lines G1, G2, . . . , Gm and n data lines D1, D2, . . . , Dn in a matrix form. The common electrode is configured to extend at least in a direction in which the gate lines extend. For convenience, FIG. 5 includes m common electrodes CT1, CT2, . . . , CTm. It is also possible to arrange m common voltage lines extending in the gate line extending direction to connect the common electrodes formed for the respective pixels to each other. Or, the common electrode may be constructed to cover the display area excepting areas such as the through-hole. In either case, the common electrode is constructed to be controllable to a predetermined potential value.

In the equivalent circuit diagram, each subpixel is representable using a capacitor (storage capacitor) Cst established by the pixel electrode, the common electrode, and the insulation layer 180 intercalated therebetween; a capacitor Clc formed by the liquid crystal layer, and a switching element 120.

To drive the subpixels, a turn on voltage is supplied thereto beginning at the first gate line G1. Specifically, the voltage (scan signal) is sequentially supplied to the m gate lines during one frame period. When the switching element 120 enters an on state in response to the scan signals, a voltage corresponding to an image signal is fed from the data line 7 via the switching element 120 to the pixel electrode. That is, while the turn on signal is being supplied to a gate line, the switching elements connected to the gate line is in the on state. At timing synchronized therewith, a data voltage is supplied to n data lines. The method of driving the liquid crystal panel 1 is substantially equal to that of the conventional IPS liquid crystal panel of active matrix drive type, and hence detailed description of the panel 1 will be avoided.

Figure 6:
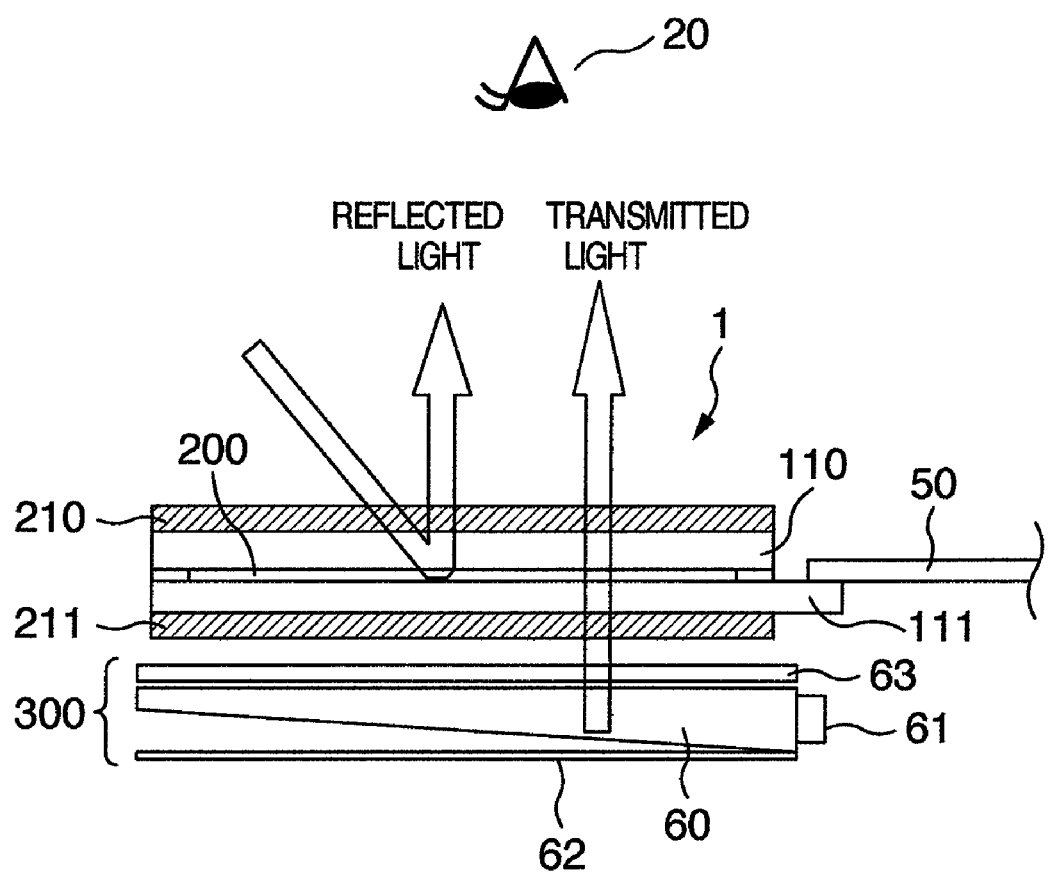
FIG. 6 is a cross-sectional view showing a general configuration of the primary section of a transflective liquid crystal display of the present invention.

FIG. 6 is a cross-sectional view showing a general configuration of the primary section of a transflective liquid crystal display of the present invention. The display includes a liquid crystal display 1 and a backlight 300 arranged on a rear side of the panel 1.

The liquid crystal display panel 1 includes the first and second transparent substrates 110 and 111 as described above.

In general, the second transparent substrate 111 is larger in size than the first transparent substrate 110. On a surface of the second substrate 111 on the side thereof facing the first substrate 110, there exists an area not coated with the first substrate 110. The area includes an area to receive image information such as an image signal in the form of an electric signal from an external device. That is, the display panel 1 includes a Flexible Printed Circuit (FPC) 50 in the area on the second substrate 111, the area not overlapping with the first substrate 110. The display panel 1 electrically connects via the FPC 50 to an external device. According to necessity, a semiconductor chip, not shown, may be mounted as a driver in the area.

The backlight 300 illuminates the display area of the display panel 1 from the rear side thereof. The backlight 300 is, for example, a backlight of edge light type (light guide type), a backlight of direct type (reflector type), or a backlight of planar light source type. An appropriate type of the backlight 300 may be selected from these types and other types depending on the use, the purpose, and the display area of the liquid crystal display. Although the backlight of edge light type will be described in conjunction with the embodiment, the present invention is not restricted by the embodiment.

The backlight 300 includes a light guide member 60 made of a transparent resin including a transparent resin. On the rear surface of the resin, a unit to change light propagation direction is formed by dot printing with white pigment or by providing, for example, a contour of fine depressions and projections or a contour of a lens. The backlight 300 further includes a light source 61 disposed on an edge surface of the light guide member 60, a reflective sheet 62 arranged on the rear surface side of the member 60, and an optical film 63 such as a prism sheet and a diffusion sheet disposed on the front surface side of the member 60.

The light source 61 may be a linear light source such as a cold or hot cathode fluorescent lamp or a point light source such as a light emitting diode (LED). Although an LED is employed for the light source 61 in the following description of the embodiment, the present invention is not restricted by the embodiment. To effectively supply light from the source to the light guide member 60 when an LED is employed for the light source 61, it is possible, for example, to dispose a reflector, not shown. Or, it is favorable to adopt an appropriate contour for the mold resin to be formed in a periphery of a light emitting section of the LED.

In the configuration, light emitted from the light source 61 enters the light guide member 60 and then propagates the inside of the member 60 by conducting total reflection. Part of the light propagating the member 60 reaches the unit for changing the light propagation direction. Therefore, the light changes its propagation direction and is emitted from the front surface side of the light guide member 60. For the light emitted from the member 60, the optical film 63 such as a prism sheet or a diffusion sheet adjusts the distribution of the emission angle of the light and the distribution of luminance in the plane. The light is then radiated onto the liquid crystal display panel 1.

Part of the light emitted from the backlight and radiated onto the liquid crystal display panel 1 enters the transmission area TA. The light then passes through the second polarizer 211 and then the liquid crystal layer 200 to enter the first polarizer 210.

In this situation, by applying to the pixel electrodes a driving voltage corresponding to image information from an image information generator, not shown, to cause a potential difference between the pixel electrodes and the common electrodes to form an electric field, it is possible to change the orientation direction of liquid crystal molecules. This changes the state of polarization of light passing through the liquid crystal layer 200 to thereby control the amount of light transmitting through the first polarizer 210.

If the driving voltage is, for example, zero volt, there exists no potential difference between the pixel electrodes and the common electrodes and hence no electric field is formed. Therefore, the state of polarization of light passing through the liquid crystal layer 200 is kept unchanged. As a result, the light passing through the layer 200 is absorbed by the first polarizer 210, leading to black (dark) display.

On the other hand, if a predetermined voltage is applied to the pixel electrodes to form a predetermined electric field between the pixel electrodes and the common electrodes, the orientation direction of the liquid crystal changes and hence the state of polarization of light passing through the liquid crystal layer 200 changes. Resultantly, an amount of light passing through the layer 200 corresponding to the change in the state of polarization of light transmits through the first polarizer 210, resulting in display with predetermined brightness. That is, black (dark) display is implemented when the driving voltage is zero and bright display is implemented when a predetermined driving voltage is applied to the electrodes, resulting in display of normally black type.

Light incident from the outside to the reflection area RA of the liquid crystal display panel 1 passes through the first polarizer 210 and the liquid crystal layer 200 to enter the polarizing layer 150.

As in the transmission area TA, it is possible in the reflection area RA to change the orientation direction of the liquid crystal by applying to the pixel electrode a driving voltage corresponding to image information from the image information generator to cause a potential difference between the pixel electrodes and the common electrodes to form a predetermined electric field between the pixel electrodes and the common electrodes. This changes the state of polarization of light passing through the liquid crystal layer 200 to thereby control the amount of light transmitting through the polarizing layer 150.

If the driving voltage is, for example, zero volt, there exists no potential difference between the pixel electrodes and the common electrodes and hence no electric field is formed. Therefore, the orientation direction of liquid crystal molecules is kept unchanged, and the state of polarization of light passing through the liquid crystal layer 200 is retained. As a result, most of the light passing through the liquid crystal layer 200 is absorbed by the polarizing layer 150, and hence light is seldom reflected to the side of an observer 20, which results in black (dark) display.

On the other hand, if a predetermined voltage is applied to the pixel electrodes to form a predetermined electric field between the pixel electrodes and the common electrodes, the orientation direction of the liquid crystal changes and hence the state of polarization of light passing through the liquid crystal layer 200 changes. Resultantly, an amount of light passing through the layer 200 corresponding to the change in the state of polarization of light transmits through the polarizing layer 150 to enter the reflection layer 130. The light incident to the reflection layer 130 reflects on the layer 130 to again enter the polarizing layer 150. However, in the reflection on the reflection layer 130, the state of polarization of the light having passed through the polarizing layer 150 is almost retained. Consequently, most of the light entering again the polarizing layer 150 transmits through the layer 150 and propagates through the liquid crystal layer 200 to enter the first polarizer 210. In the operation, the state of polarization of light passing through the liquid crystal layer 200 similarly changes. That is, an amount of light passing through the liquid crystal layer 200 corresponding to the change in the state of polarization of light transmits through the first polarizer 210, resulting in display with predetermined brightness. That is, black (dark) display is implemented when the driving voltage is zero and bright display is implemented when a predetermined driving voltage is applied to the electrodes, implementing reflective display of normally black type.

Figure 7:
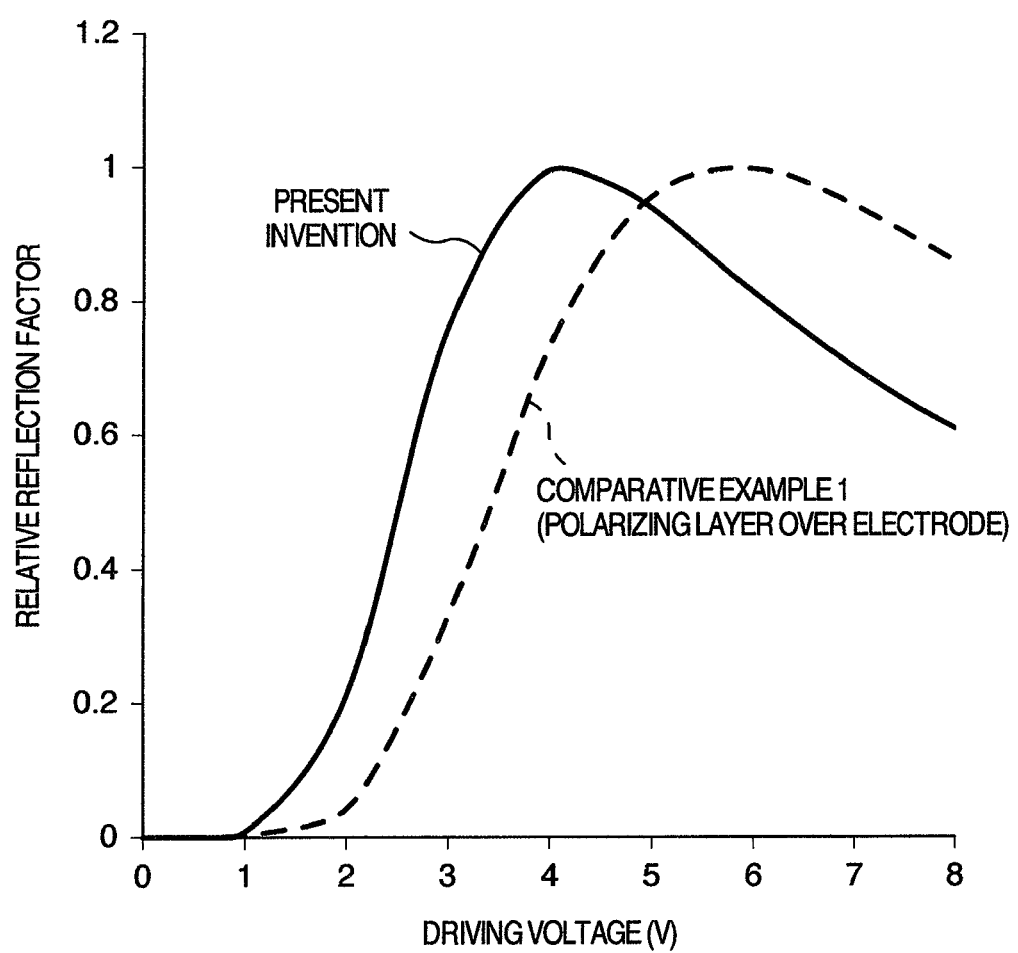
FIG. 7 is a graph showing an example of a relationship between a driving voltage and a reflection factor of a transflective liquid crystal display of the present invention.

FIG. 7 shows an example of a graph representing a relationship between a driving voltage and a reflection factor of a transflective liquid crystal display of the present invention. This is a result of simulation conducted on assumption that the polarizing layer is made of a material of coating type, $\Delta N=0.1$ for the liquid crystal, and $d=4$ micrometers ($\mu m$) for the liquid crystal layer. FIG. 7 also shows comparative example 1 in which the pixel electrodes are covered with a polarizing layer similar to that of the present invention. In the graph, the horizontal axis indicates the driving voltage and the vertical axis indicates a relative reflection factor obtained by normalizing the reflection factor based on the maximum reflection factor of comparative example 1.

In the transflective liquid crystal display of the present invention, by arranging a polarizing layer between the pixel and common electrodes and the reflection layer in the reflection area RA, a higher reflection factor is obtained with a lower driving voltage when compared with a case in which the pixel and common electrodes are coated with a polarizing layer. For example, as can be seen from FIG. 7, if the polarizing layer is 300 nm thick and has a dielectric constant of 3.5 and a dichroic ratio of about 25, the driving voltage lowers about two volt according to the present embodiment as compared with comparative example 1. Also, the reflection ratio increases about 36% when compared with that of comparative example 1, with the driving voltage set to four volt in both cases. Absolute values of these advantages vary depending on the property and the thickness of the polarizing layer, the width and the pitch of the pixel electrodes, and the thickness and the property of the liquid crystal layer. In the transflective liquid crystal display according to the present invention, by disposing the polarizing layer between the reflective layer and the common electrodes, there are obtained advantages that the driving voltage lowers and the reflection factor increases as compared with the prior art. That is, since no polarizing layer exists between the liquid crystal layer and the pixel and common electrodes in the configuration, it is possible to suppress an adverse influence onto the liquid crystal layer due to the polarizing layer. This results in advantages, i.e., improvement in the reflection factor and improvement in the contrast ratio associated with the improvement in the reflection factor, reduction in power consumption due to the lowered driving voltage, and cost reduction due to the use of a low voltage general driver.

Figure 8:
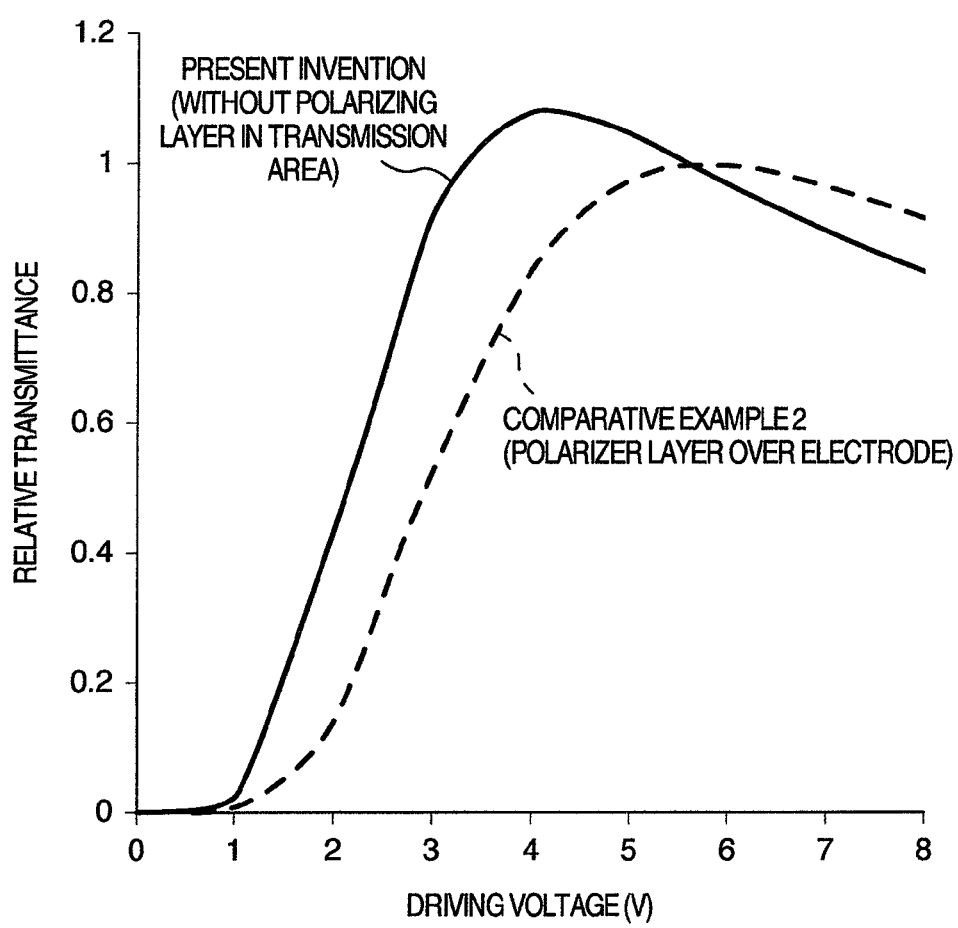
FIG. 8 is a graph showing an example of a relationship between a driving voltage and a transmittance of a transflective liquid crystal display of the present invention.

FIG. 8 graphically shows an example of a relationship between a driving voltage and a transmittance of a transflective liquid crystal display according to the present invention. This is a result of a simulation similar to that of FIG. 7. FIG. 8 also shows comparative example 2 in which the pixel electrodes are coated with a polarizing layer in the transmission area. In FIG. 8, the horizontal axis indicates the driving voltage and the vertical axis indicates a relative transmittance obtained by normalizing the transmittance based on the maximum transmittance of comparative example 2.

In the transflective liquid crystal display of the present invention, the polarizing layer is removed from the transmission area and hence higher transmittance is obtained with a lower driving voltage when compared with a case in which there exists a polarizing layer to coat the pixel electrodes. For example, as can be seen from FIG. 8, if the polarizing layer is 300 nm thick and has a dielectric constant of 3.5 and a dichroic ratio of about 25 in comparative example 2, the driving voltage lowers about two volt and the maximum value of transmittance increases about 8%. According to the present invention, the transmittance increases about 29%, with the driving voltage set to four volt in both cases.

Absolute values of these advantages vary depending on the property and the thickness of the polarizing layer, the width and the pitch of the pixel electrodes, and the thickness and the property of the liquid crystal layer. In the transflective liquid crystal display of the present invention, since no polarizing layer exists in the transmission area, there are obtained advantages that the driving voltage lowers and the transmittance increases as compared with the prior art for the following reason. Since no polarizing layer exists between the liquid crystal layer and the pixel and common electrodes, it is possible to suppress an adverse influence onto the liquid crystal layer due to the polarizing layer. Additionally, by removing the polarizing layer as above, there are fewer members to absorb light in the transmission area.

This hence results in advantages, i.e., improvement in the transmittance and improvement in the contrast ratio associated with the improvement in the transmittance, and reduction in power of the backlight corresponding to the improvement in the transmittance for image display of the same brightness. There is also obtained advantages, namely, lowering in power consumption due to the reduction in the driving voltage and cost reduction due to the use of a low voltage general driver.

Depending on materials of the polarizing layer, there exists a fear of deterioration in the liquid crystal layer due to the polarizing layer. In the transflective liquid crystal display of the present invention, since no polarizing layer is disposed in the transmission area TA, even if the polarizing layer is likely to be a contamination source to deteriorate the liquid crystal layer, the amount of the material can be reduced. Additionally, since the protection layer 160, the common electrode 170, and the insulation layer 180 are laminated between the liquid crystal layer and the polarizing layer, there is implemented a construction to easily protect the liquid crystal layer. Suppression of the deterioration in the liquid crystal layer due to the polarizing layer will be advantageously enhanced by forming a fine film using silicon nitride (SiNx) or the like, for example, as the protection layer 160 or the insulation layer 180.

Embodiment 2

Figure 9:
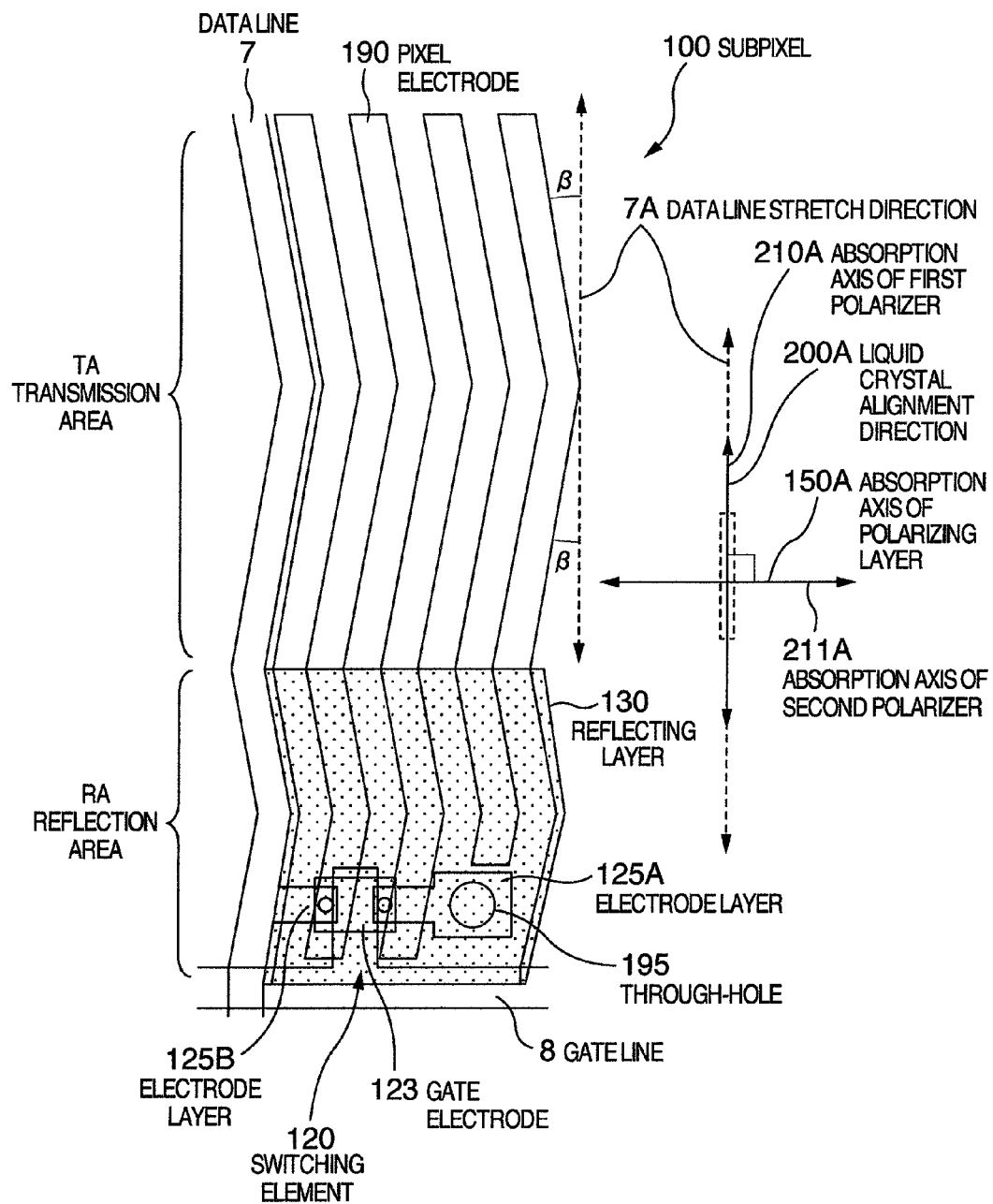
FIG. 9 is a plan view showing a general configuration of the primary section of a subpixel used in a liquid crystal display panel of a transflective liquid crystal display of the present invention.

Referring now to the drawings, description will be given of a second embodiment of a transflective liquid crystal display according to the present invention. FIG. 9 is a plan view showing a general configuration of the primary section of a subpixel 100 used in a liquid crystal display panel of a transflective liquid crystal display of the present invention. In the second embodiment, the constituent components having the same functions as those of the first embodiment will be assigned with the same reference numerals, and hence description thereof will be avoided.

FIG. 9 also shows an example to explain a relationship between an absorption axis 210A of linearly polarized light of the first polarizer 210, an absorption axis 211A of linearly polarized light of the second polarizer 211A, an alignment direction 200A of a molecular long axis of liquid crystal in the liquid crystal layer 200, an absorption axis 150A of linearly polarized light of the polarizing layer 150, and a longitudinal stretch direction 7A of the data line 7.

In the arrangement of the second embodiment, the alignment direction 200A of a molecular long axis of liquid crystal in the liquid crystal layer 200 and the absorption axis 210A of linearly polarized light of the first polarizer 210 are parallel to the longitudinal stretch direction 7A of the data line 7. The absorption axis 211A of linearly polarized light of the second polarizer 211A and the absorption axis 150A of linearly polarized light of the polarizing layer 150 are perpendicular to the absorption axis 210A of linearly polarized light of the first polarizer 210.

Particularly, in the transmission area TA and the reflection area RA of the second embodiment, each pixel electrode 190 in the comb shape is bent at an intermediate point thereof. Assume in FIG. 9 that the bending angle of the pixel electrode 190 with respect to the stretch direction 7A of the data line 7, namely, the angle of inclination of the pixel electrode 190 relative to the liquid crystal alignment direction 200A is defined as ±β. The value of β is set within a range from 5° to 30°. In consideration of stability in the liquid crystal alignment and brightness of display, angle β is desirably set to a value ranging from 7° to 15°.

To reduce ineffective areas, as can be seen from FIG. 9, the data line 7 is desirably bent in association with the curved contour of the pixel electrode, specifically, with an angle similar to the bending angle of the pixel electrode.

The absorption axis 150A of the polarizing layer 150 is parallel to the stretch direction 7A of the data line 7 as described above. Therefore, if the polarizing layer 150 is made of a material similar to that described in pages 1170 to 1173 of "Current Status and Future Prospect of In-Cell Polarizer Technology" written by Y. Ukai et al. in SID 04 DIGEST, 2004, the coating direction of the material is favorably perpendicular to the stretch direction 7A of the data line 7.

The second transparent substrate 111 of the display panel 1 has the shape of a rectangle having edges parallel to the stretch direction of the data line 7 or the gate line 8. Therefore, as described in conjunction with the first embodiment, the absorption axis of the polarizing layer is inclined with respect to the stretch direction of the data line 7. Assume that the polarizing layer is made of the material described in pages 1170 to 1173 of "Current Status and Future Prospect of In-Cell Polarizer Technology" written by Y. Ukai et al. in SID 04 DIGEST, 2004 or a material in which the absorption axis is formed in the direction perpendicular to the coating direction thereof like the material above. The coating direction is required to be inclined relative to the stretch direction of the data line, i.e., the edges of the second substrate 111 described above. In this situation, it is not possible for the general slit dye coater to coat the material on the corners of the transparent substrate. It is hence required to dispose ineffective areas on the substrate on which the material cannot be coated.

On the other hand, the absorption axis 150A of the polarizing layer 150 is parallel to the stretch direction 7A of the data line 7 in the second embodiment. Assume that the polarizing layer 150 is made of the material described in pages 1170 to 1173 of "Current Status and Future Prospect of In-Cell Polarizer Technology" written by Y. Ukai et al. in SID 04 DIGEST, 2004 or a material in which the absorption axis is formed in the direction perpendicular to the coating direction thereof like the material above. It is only required in this situation that the coating direction is parallel to the stretch direction of the data line, i.e., the edges of the second substrate 111 described above. In this case, the ineffective areas on the substrate on which the material cannot be coated are reduced, leading to an advantage of increase in productivity.

In general the second transparent substrate 111 of the display panel 1 is obtained using a large mother substrate, which is subdivided into a plurality of substrates. Since the mother substrate is rectangle, if the coating direction of a material of the polarizing layer is in the stretch direction of the data line as in the second embodiment, namely, parallel to the edges of the second substrate 111, the ineffective areas on which the material cannot be coated are reduced also in the mother substrate. This makes it possible to efficiently obtain the second transparent substrates. In other words, a larger number of second transparent substrates are obtained from one mother substrate. This results in advantages that the productivity is improved and the production cost lowers.

In the second embodiment like the first embodiment, by disposing a polarizing layer between the pixel and common electrodes and the reflecting layer in the reflection area RA, a lower driving voltage and a higher reflection factor are obtained when compared with a case in which the pixel and common electrodes are coated with the polarizing layer, that is, the polarizing layer is disposed between the liquid crystal layer and the pixel and common electrodes. There are hence attained advantages, i.e., improvement in the reflection factor and improvement in the contrast ratio associated with the improvement in the reflection factor, reduction in power consumption associated with the lowered driving voltage, and cost reduction due to the use of a low voltage general driver.

Since the polarizing layer is removed from the transmission area TA, a lower driving voltage and a higher reflection factor are obtained when compared with a case in which there exists a polarizing layer coating the pixel electrodes. This hence results in advantages, i.e., improvement in the transmittance and improvement in the contrast ratio associated with the improvement in the transmittance, and reduction in power of the backlight corresponding to the improvement in the transmittance for image display of the same brightness. There are also obtained advantages, namely, lowering in power consumption due to the reduction in the driving voltage and cost reduction due to the use of a low voltage general driver.

Particularly, by bending the pixel electrodes in the second embodiment, there exist a plurality of liquid crystal alignment directions when the driving voltage is applied, which resultantly leads to an advantage of improvement in the viewing angle property.

Even if the absorption axis 210A of the first polarizer, the absorption axis 211A of the second polarizer, and the absorption axis 150A of the polarizing layer are rotated by 90° relative to the direction shown in FIG. 9, there is attained an advantage similar to that described above.

Embodiment 3

Referring now to the drawings, description will be given of a third embodiment of a transflective liquid crystal display according to the present invention. In the third embodiment, the same constituent components as those of the first and second embodiments will be assigned with the same reference numerals, and hence description thereof will be avoided.

Figure 10:
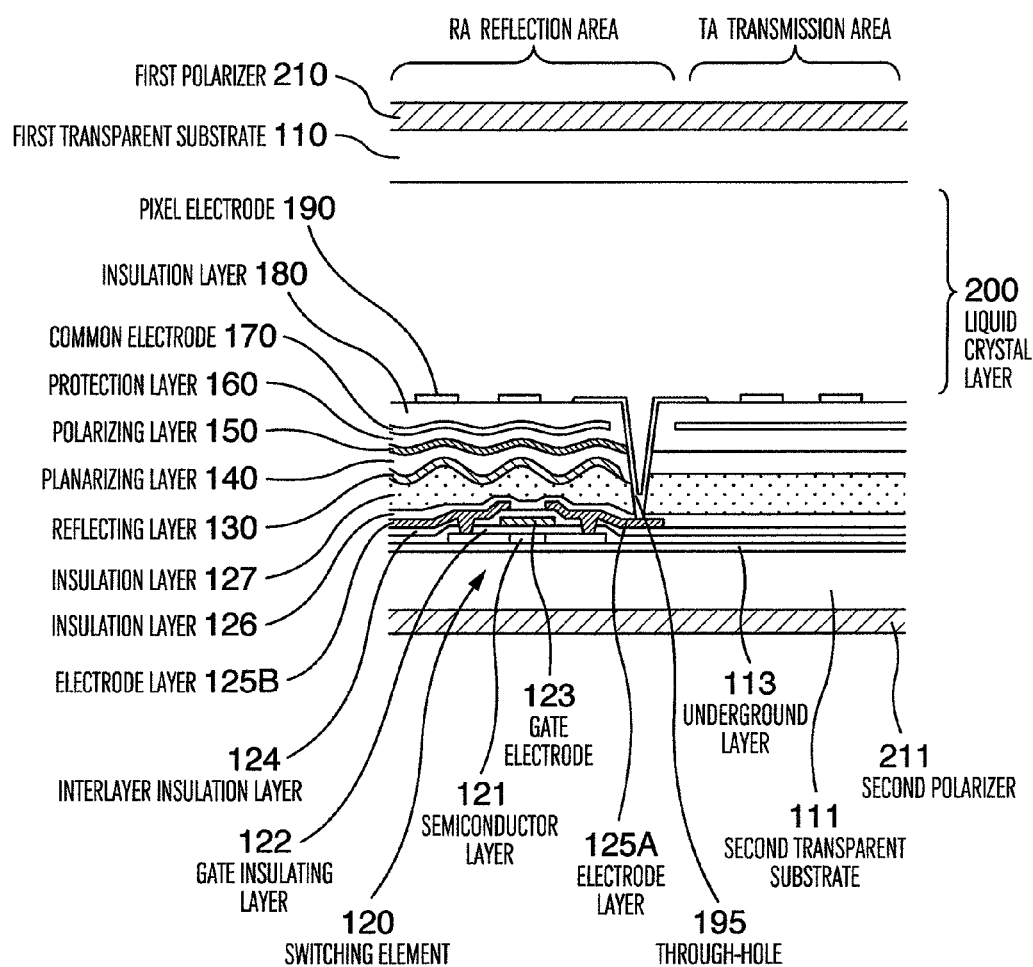
FIG. 10 is a cross-sectional view showing a general configuration of a primary section of a subpixel used in a liquid crystal display panel of a transflective liquid crystal display according to the present invention.
Figure 11:
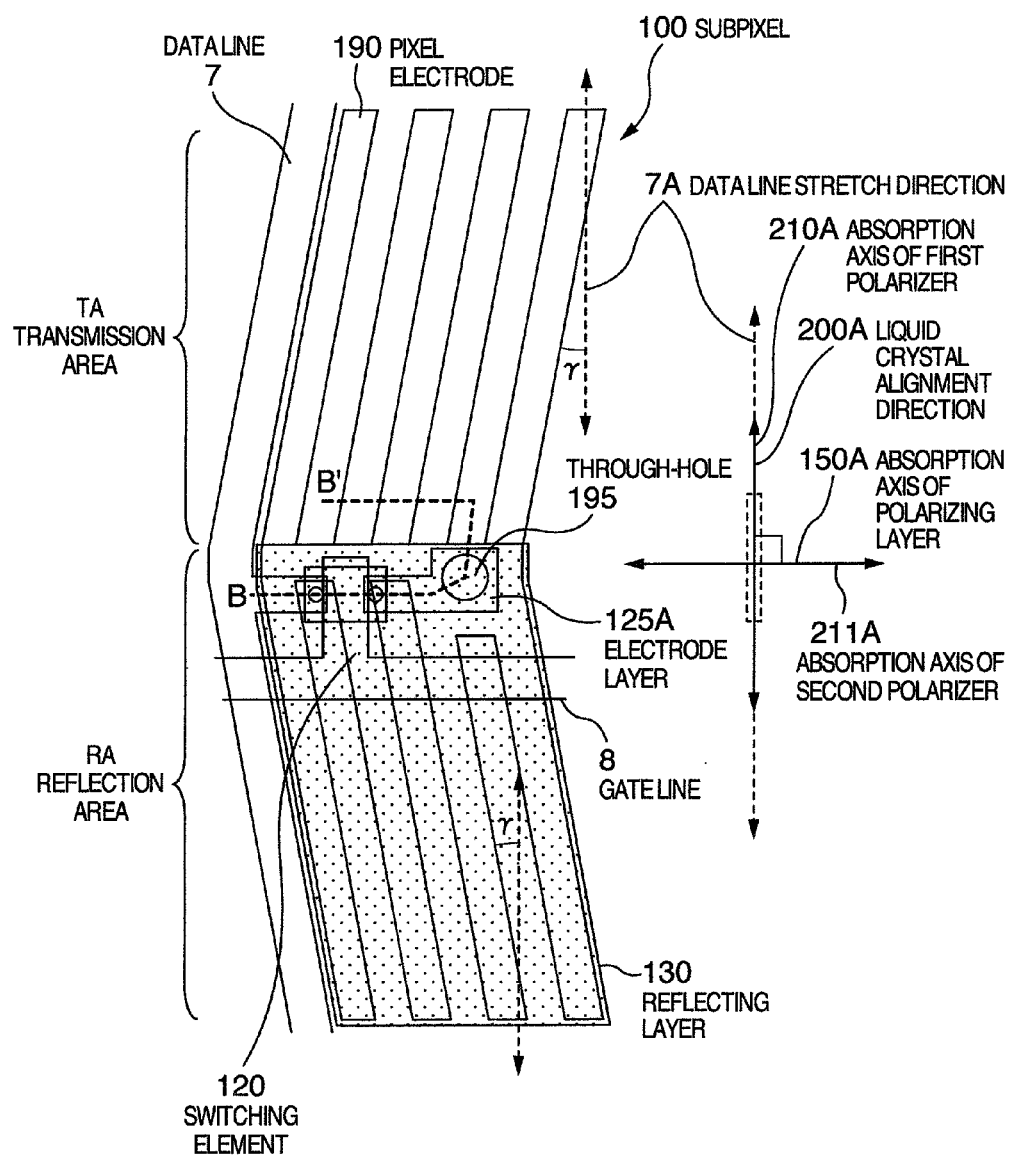
FIG. 11 is a plan view showing a general configuration of the primary section of a subpixel used in a liquid crystal display panel of a transflective liquid crystal display according to the present invention.

FIG. 10 is a cross-sectional view showing a general configuration of a primary section of a subpixel used in a liquid crystal display panel of a transflective liquid crystal display of the present invention. FIG. 11 is a plan view showing a general configuration of the primary section of a subpixel 100 used in a liquid crystal display panel of a transflective liquid crystal display of the present invention. FIG. 10 schematically shows a cross section taken along line B-B' of FIG. 11. FIG. 11 also shows an example to explain a relationship between an absorption axis 210A of linearly polarized light of the first polarizer 210, an absorption axis 211A of linearly polarized light of the second polarizer 211A, an alignment direction 200A of a molecular long axis of liquid crystal in the liquid crystal layer 200, an absorption axis 150A of linearly polarized light of the polarizing layer 150, and a longitudinal stretch direction 7A of the data line 7.

In the third embodiment, the through-hole 195 connecting the pixel electrodes 190 to the switching element 120 is arranged in the reflection area RA and in the vicinity of a boundary between the transmission area TA and the reflection area RA. The pixel electrodes 190 are inclined relative to the stretch direction 7A of the data line 7. Both inclination angles γ relative to the stretch direction 7A in the transmission area TA and the reflection area RA have the same magnitude, but, the direction to rotate the pixel electrodes is reversed between the transmission area TA and the reflection area RA. Therefore, the pixel electrodes bend in the vicinity of the boundary between the transmission area TA and the reflection area RA, i.e., in the vicinity of the through-hole 195. In other words, the through-hole 195 is disposed in the bending section of the pixel electrodes 190.

In the arrangement of the third embodiment, the alignment direction 200A of the molecular long axis of liquid crystal in the liquid crystal layer 200 and the absorption axis 210A of linearly polarized light of the first polarizer 210 are parallel to the longitudinal stretch direction 7A of the data line 7. The absorption axis 211A of linearly polarized light of the second polarizer 211A and the absorption axis 150A of linearly polarized light of the polarizing layer 150 are perpendicular to the absorption axis 210A of linearly polarized light of the first polarizer 210.

The bending angle of the pixel electrodes 190 with respect to the stretch direction 7A of the data line 7, namely, the angle of inclination γ of the pixel electrodes 190 relative to the liquid crystal alignment direction 200A is set within a range from 5° to 30°. In consideration of stability in the liquid crystal alignment and brightness of display, angle γ is desirably set to a value ranging from 7° to 15°.

To reduce ineffective areas, as can be seen from FIG. 9, the data line 7 is desirably bent in association with the curved contour of the pixel electrodes, namely, with an angle of γ as for the pixel electrodes.

In the third embodiment as in the second embodiment, the absorption axis 150A of the polarizing layer 150 is perpendicular to the stretch direction 7A of the data line 7. Assume that the polarizing layer 150 is made of the material described in pages 1170 to 1173 of "Current Status and Future Prospect of In-Cell Polarizer Technology" written by Y. Ukai et al. in SID 04 DIGEST, 2004 or a material in which the absorption axis is formed in the direction perpendicular to the coating direction thereof like the material above. It is only required in this situation that the coating direction is parallel to the stretch direction of the data line, i.e., the edges of the second substrate 111 described above. Therefore, if a slit dye coater or the like is employed to coat the material, there is obtained an advantage that the ineffective areas on the substrate on which the material cannot be coated are reduced. In a case in which the second transparent substrate 111 is obtained by subdividing one large mother substrate, the ineffective areas on the substrate on which the material cannot be coated are reduced. That is, a larger number of second transparent substrates can be obtained from one mother substrate, leading to an advantage in which productivity is improved and the production cost lowers.

In the third embodiment like the above embodiments, by disposing a polarizing layer between the pixel and common electrodes and the reflecting layer in the reflection area RA, a lower driving voltage and a higher reflection factor are obtained when compared with a case in which the pixel and common electrodes are coated with the polarizing layer, that is, the polarizing layer is disposed between the liquid crystal layer and the pixel and common electrodes. There are hence attained advantages, i.e., improvement in the reflection factor and improvement in the contrast ratio associated with the improvement in the reflection factor, reduction in power consumption associated with the lowered driving voltage, and cost reduction due to the use of a low voltage general driver.

Since the polarizing layer is removed from the transmission area TA, a lower driving voltage and a higher transmittance are obtained when compared with a case in which there exists a polarizing layer coating the pixel electrodes. This hence results in advantages, i.e., improvement in the transmittance and improvement in the contrast ratio associated with the improvement in the transmittance, and reduction in power of the backlight corresponding to the improvement in the transmittance for image display of the same brightness. There is also obtained advantages, namely, lowering in power consumption due to the reduction in the driving voltage and cost reduction due to the use of a low voltage general driver.

According to an aspect of the third embodiment, the through-hole is arranged particularly in the bending section of the pixel electrodes.

In the situation wherein the pixel electrodes bend at an intermediate point thereof, when the driving voltage is applied to the display panel, the liquid crystal alignment direction varies between the areas before and after the bending section. Therefore, a domain appears in the bending section. That is, the bending sections of the pixel electrodes do not particularly contribute to the brightness of display. On the other hand, the section where the through-hole is disposed does not particularly contribute to the brightness of display, either. By disposing the through-hole in the vicinity of the bending section, the areas not contributing to the brightness of display can be arranged in one small area. In the third embodiment in which the pixel electrodes are particularly bent as above, there can be implemented display with higher brightness.

Embodiment 4

Figure 12:
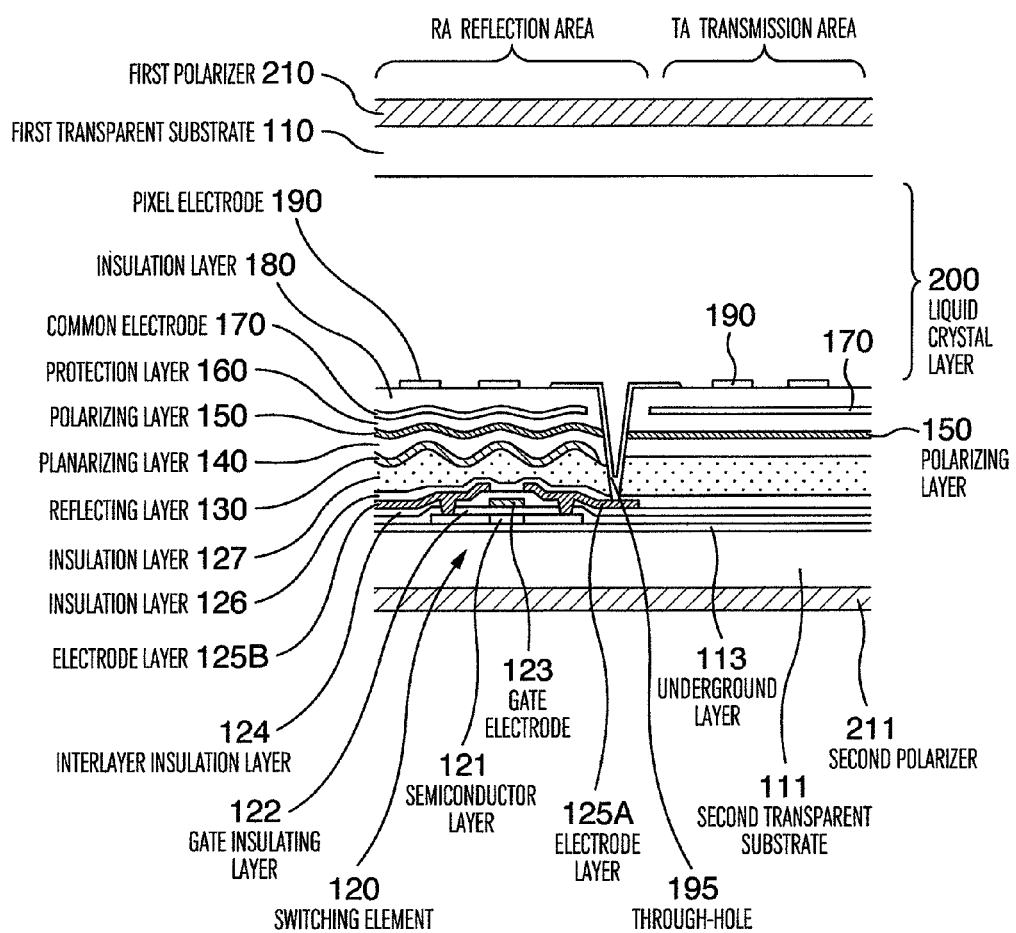
FIG. 12 is a cross-sectional view showing a general configuration of a primary section of a subpixel used in a liquid crystal display panel of a transflective liquid crystal display according to the present invention.

Next, referring to the drawings, description will be given of a fourth embodiment of a transflective liquid crystal display according to the present invention. FIG. 12 is a cross-sectional view showing a general configuration of a primary section of a subpixel used in a liquid crystal display panel of a transflective liquid crystal display according to the present invention.

The fourth embodiment is substantially equal to the liquid crystal panel described in conjunction with the third embodiment excepting that the polarizing layer 150 is arranged also in the transmission area TA. Therefore, the same constituent components of the fourth embodiment as those of the third embodiment of the transflective liquid crystal display will be assigned with the same reference numerals, and hence description thereof will be avoided.

In the fourth embodiment, the polarizing layer 150 is arranged, in the transmission area TA, between the pixel electrodes 190 and common electrodes 170 to drive the liquid crystal and the second transparent substrate 111. The polarizing layer 150 may be made of a material employed to form the polarizing layer disposed in the reflection area RA. The polarizing layer 150 has an absorption axis aligned with that of the second polarizer 211 as in the reflection area.

Figure 13:
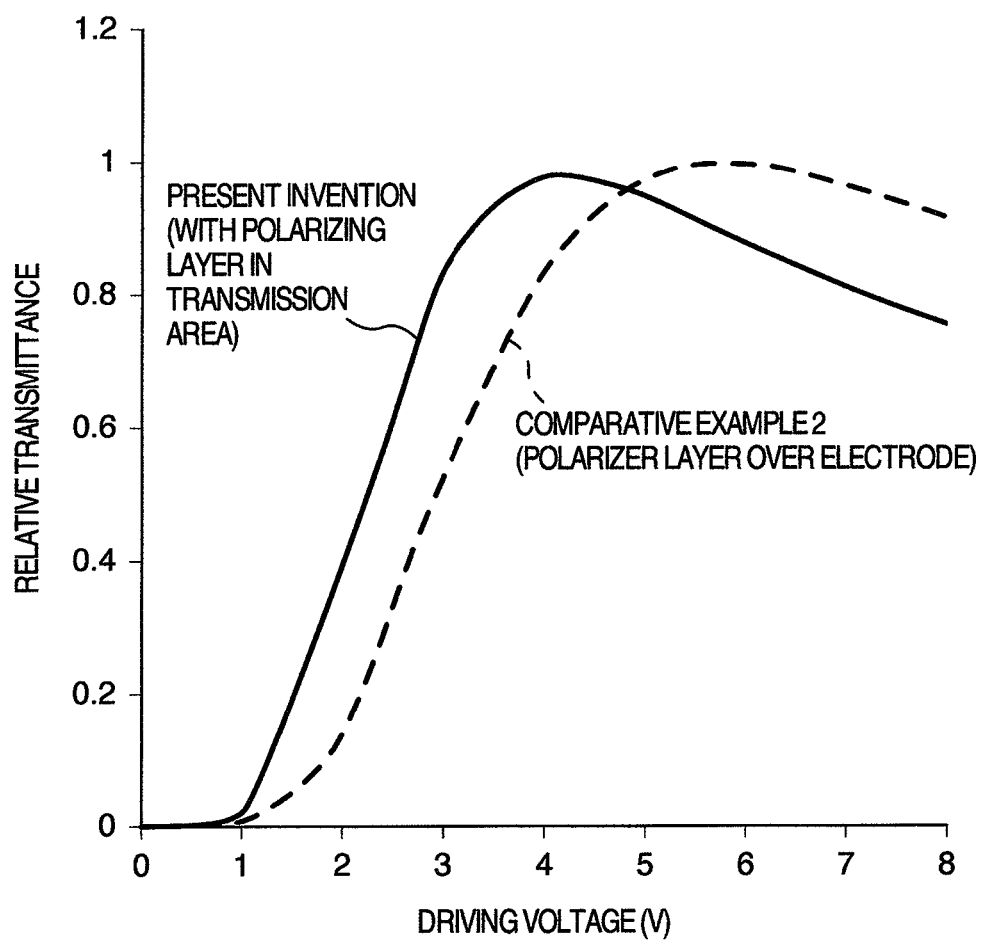
FIG. 13 is a graph showing an example of a relationship between a driving voltage and a transmittance of a transflective liquid crystal display of the present invention.

FIG. 13 is a graph showing an example of a relationship between the driving voltage and the transmittance of a transflective liquid crystal display according to the present invention. The graph shows results of simulation similar to that shown in FIG. 8. FIG. 13 also shows comparative example 2 in which the pixel electrodes are coated with a polarizing layer. In FIG. 13, the horizontal axis indicates the driving voltage and the vertical axis indicates a relative transmittance obtained by normalizing the transmittance based on the maximum transmittance of comparative example 2.

In the fourth embodiment, the polarizing layer is disposed also in the transmission area TA. This is not the case with the embodiments described above. However, in the fourth embodiment, no polarizing layer is arranged between the pixel and common electrodes and the liquid crystal layer. This hence completely removes any adverse influence upon the liquid crystal driving due to the polarizing layer. Consequently, a lower driving voltage and higher transmittance are obtained as compared with the case in which the pixel electrodes are coated with a polarizing layer, namely, there is arranged a polarizing layer between the liquid crystal layer and the pixel and common electrodes. For example, as can be seen from FIG. 13, if thickness d of the polarizing layer is 300 nm, a dielectric constant thereof is 3.5, and a dichroic ratio thereof is about 25, the driving voltage lowers about two volt. Transmittance increases about 17% with the driving voltage set to four volt in both cases. Absolute values of these advantages vary depending on the property and the thickness of the polarizing layer, the width and the pitch of the pixel electrodes, and the thickness and the property of the liquid crystal layer. In the transflective liquid crystal display of the present invention, since no polarizing layer exists between the liquid crystal layer and the pixel and common electrodes, high transmittance is obtained with a lower driving voltage.

Therefore, when the driving voltage is set to, for example, four volt, there are obtained advantages of improvement in the transmittance and improvement in the contrast ratio associated that in the transmittance. When the brightness of image display is the same in both cases, there are attained advantages of reduction in power of the backlight in association with the improvement in the transmittance. In a case in which the maximum transmittance is used, there are obtained advantages that power consumption lowers due to the reduction in the driving voltage and the cost is reduced by using a low voltage driver.

In the fourth embodiment when compared with the above mentioned embodiments, the polarizing layer is arranged also in the transmission area, and hence transmittance lowers. However, the reduction in the transmittance in the black (dark) display due to the polarizing layer is more than the reduction in the transmittance in the white (bright) display. The contrast ratio advantageously increases in transmissive display. For example, when the thickness of the polarizing layer is 300 nm and the dichroic ratio thereof is about 25, the contrast ratio increases about 1.9 times that obtained when the polarizing layer is removed from the transmission area.

Embodiment 5

Referring now to the drawings, description will be given of a fifth embodiment of a transflective liquid crystal display according to the present invention. In the fifth embodiment, the same constituent components as those of the above embodiments will be assigned with the same reference numerals, and hence description thereof will be avoided.

Figure 14:
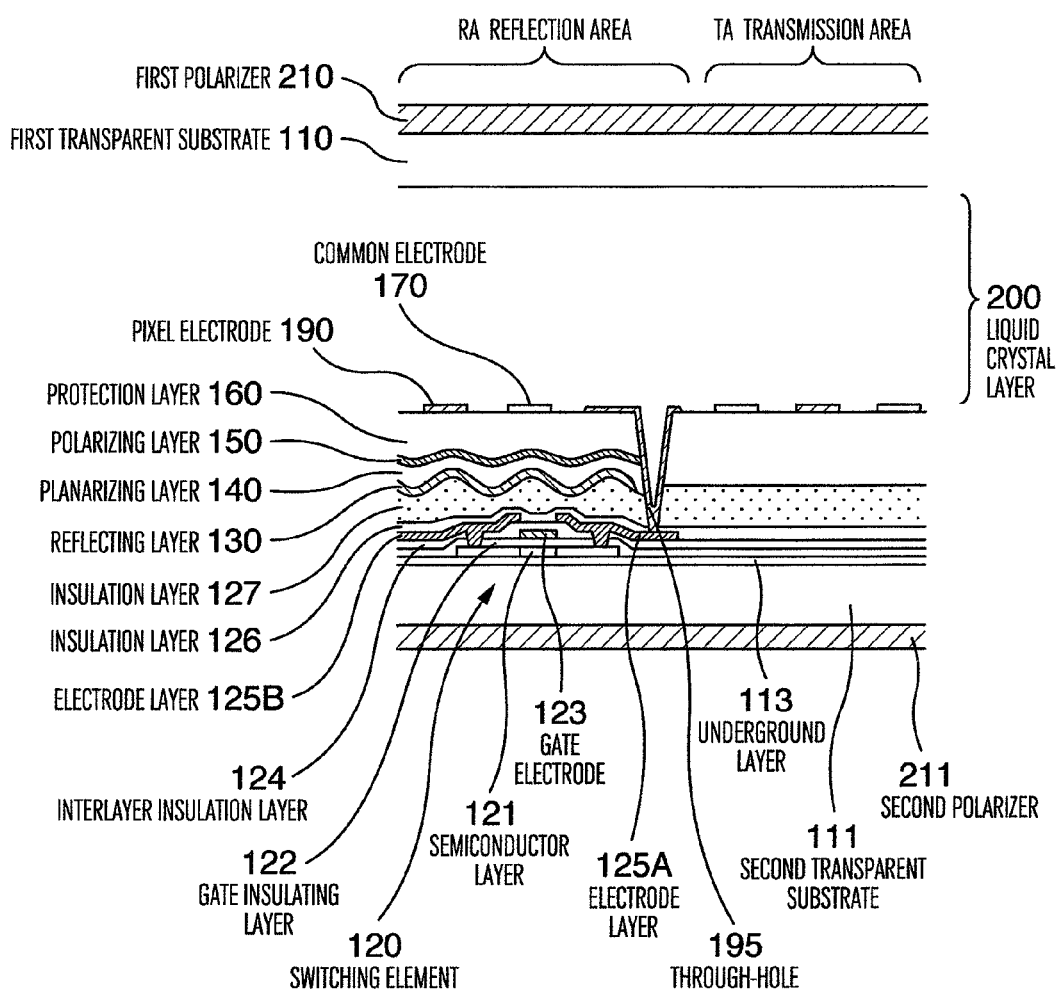
FIG. 14 is a cross-sectional view showing a general configuration of a primary section of a subpixel used in a liquid crystal display panel of a transflective liquid crystal display according to the present invention.

FIG. 14 is a cross-sectional view showing general structure of a primary section of a subpixel used in a liquid crystal display panel of a transflective liquid crystal display according to the present invention. As shown in FIG. 14, the common electrodes 170 and the pixel electrodes 190 are formed in one and the same layer in the fifth embodiment. The common electrodes 170 and the pixel electrodes 190 are each in the form of a comb and are alternately arranged. That is, the electrodes are configured in almost the same way as for the conventional liquid crystal display of IPS type.

In the fifth embodiment, a polarizing layer is arranged between the pixel and common electrodes and the reflecting layer in the reflection area RA as in the above embodiments. This leads to a lower driving voltage and a higher reflection factor when compared with a case in which the pixel and common electrodes are coated with a polarizing layer. This results in advantages, i.e., improvement in the reflection factor and improvement in the contrast ratio associated with the improvement in the reflection factor, reduction in power consumption due to the lowered driving voltage, and cost reduction due to the use of a low voltage general driver.

Since the polarizing layer is absent from the transmission area, higher transmittance is obtained with a lower driving voltage when compared with a case in which there exists a polarizing layer to coat the pixel electrodes, namely, there exists a polarizing layer between the liquid crystal layer and the pixel and common electrodes. This hence results in advantages, namely, improvement in the transmittance and improvement in the contrast ratio associated with the improvement in the transmittance, and reduction in power of the backlight corresponding to the improvement in the transmittance for image display of the same brightness. There are also obtained advantages, namely, lowering in power consumption due to the reduction in the driving voltage and cost reduction due to the use of a low voltage general driver.

It should be further understood by those skilled in the art that although the foregoing description has been on embodiments of the invention, the invention is not limited thereto and various change and modifications may be made without departing from the spirit of the invention and the scope of the appended claims.

The invention claimed is:

1. A transflective liquid crystal display, comprising:
a liquid crystal display panel comprising a first substrate, a second substrate, a liquid crystal layer intercalated between the first substrate and the second substrate, and pixel electrodes and common electrodes disposed on the second substrate for driving the liquid crystal layer;
a backlight disposed on one surface of the liquid crystal display panel;
a first polarizer disposed on a first side of the first substrate, the first side being opposite to a side of the first substrate where the second substrate is disposed;
a second polarizer disposed on a first side of the second substrate, the first side being opposite to a side of the second substrate where the first substrate is disposed; and
a thin film transistor (TFT), wherein
the liquid crystal display panel includes pixels, each pixel including a reflection area and a transmission area;
the reflection area includes a reflective layer disposed between the second substrate and an electrode group including the pixel electrodes and the common electrodes, and a polarizing layer disposed between the reflective layer and an electrode group including the pixel electrodes and the common electrodes;
the first polarizer includes an absorption axis and the second polarizer includes an absorption axis, the axes being perpendicular to each other, and the polarizing layer includes an absorption axis parallel to the absorption axis of the second polarizer;
the liquid crystal layer includes an alignment direction parallel or perpendicular to the absorption axis of the first polarizer;
the reflective layer includes a contour of depressions and projections on at least one surface thereof, the liquid crystal display further comprising:
a planarizing layer between the polarizing layer and the reflective layer;
the planarizing layer being employed to provide a planar surface on which the polarizing layer is formed;
the reflective layer is an upper layer of the TFT in the reflection area; and
the reflective layer is a lower layer of the planarizing layer in the reflection area.

2. A transflective liquid crystal display according to claim 1, further comprising a protection layer between the polarizing layer and an electrode group including the common electrodes and the pixel electrodes, wherein
the protection layer is formed using a photoresist material.

3. A transflective liquid crystal display according to claim 1, further comprising a protection layer between the polarizing layer and an electrode group including the common electrodes and the pixel electrodes, wherein
the protection layer is formed using silicon nitride.

4. A transflective liquid crystal display according to claim 1, wherein:
the common electrodes and the pixel electrodes are formed on mutually different layers, the layers intercalating an insulation layer;
the pixel electrodes or the common electrodes less apart from the liquid crystal layer are formed in a contour of a comb, and the pixel electrodes or the common electrodes more apart from the liquid crystal layer are formed in a planar contour; and the pixel electrodes and the common electrodes are formed using a transparent electrically conductive material.

5. A transflective liquid crystal display according to claim 1, wherein:
the pixel electrodes and the common electrodes are formed on one and the same layer;
the pixel electrodes and the common electrodes are formed respectively in a contour of a comb, the pixel and common electrodes being alternately disposed; and
the pixel electrodes and the common electrodes are formed using a transparent electrical conductive material.

6. A transflective liquid crystal display according to claim 1, wherein:
the transmission area includes a polarizing layer between the second substrate and a electrode group including the pixel electrodes and the common electrodes; and
the polarizing layer includes an absorption axis parallel to the absorption axis of the second polarizer.

7. A transflective liquid crystal display according to claim 5, wherein the electrodes formed in a contour of a comb are bent.

8. A transflective liquid crystal display, comprising:
a liquid crystal display panel comprising a first substrate, a second substrate, a liquid crystal layer intercalated between the first substrate and the second substrate, and pixel electrodes and common electrodes disposed on the second substrate for driving the liquid crystal layer;
a backlight disposed on one surface of the liquid crystal display panel;
a first polarizer disposed on a first side of the first substrate, the first side being opposite to a side of the first substrate where the second substrate is disposed;
a second polarizer disposed on a first side of the second substrate, the first side being opposite to a side of the second substrate where the first substrate is disposed; and
a thin film transistor (TFT),
wherein:
the liquid crystal display panel includes pixels, each pixel including a reflection area and a transmission area;
the reflection area includes a reflective layer disposed between the second substrate and a electrode group including the pixel electrodes and the common electrodes, and a polarizing layer disposed between the reflective layer and the liquid crystal layer;

the first polarizer includes an absorption axis and the second polarizer includes an absorption axis, the axes being perpendicular to each other, and the polarizing layer includes an absorption axis parallel to the absorption axis of the second polarizer;
the liquid crystal layer includes an alignment direction of liquid crystal molecules, the alignment direction being parallel or perpendicular to the absorption axis of the first polarizer;
the common electrodes and the pixel electrodes are formed on mutually different layers, the layers intercalating an insulation layer;
the pixel electrodes or the common electrodes less apart from the liquid crystal layer are formed in a contour of a comb, and the pixel electrodes or the common electrodes more apart from the liquid crystal layer are formed in a planar contour;
the electrodes formed in a contour of a comb are bent,
the pixel electrodes and the common electrodes are formed using a transparent electrical conductive material;
the absorption axis of the polarizing layer is parallel or perpendicular to one edge of the second substrate;
the reflective layer includes a contour of depressions and projections on at least one surface thereof, the liquid crystal display further comprising:
a planarizing layer between the polarizing layer and the reflective layer;
the planarizing layer being employed to provide a planar surface on which the polarizing layer is formed;
the reflective layer is an upper layer of the TFT in the reflection area; and
the reflective layer is a lower layer of the planarizing layer in the reflection area.

9. A transflective liquid crystal display according to claim 8, wherein:
the second substrate includes a switching element for applying to the pixel electrodes a voltage corresponding to image information inputted thereto and a through-hole for connecting the pixel electrodes to the switching element; and
the through-hole is formed in a bending section of the pixel electrodes.

10. A transflective liquid crystal display according to claim 1, wherein the electrode group including the pixel electrodes and the common electrodes are configured is an upper layer of the polarizing layer.

* * * * *